(12) United States Patent
Misawa et al.

(10) Patent No.: US 9,899,670 B2
(45) Date of Patent: Feb. 20, 2018

(54) SECONDARY BATTERY-USE ACTIVE MATERIAL, SECONDARY BATTERY-USE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Masaki Misawa, Tochigi (JP); Toru Odani, Fukushima (JP); Toshio Nishi, Saitama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 271 days.

(21) Appl. No.: 14/760,403

(22) PCT Filed: Jan. 9, 2014

(86) PCT No.: PCT/JP2014/050188
§ 371 (c)(1),
(2) Date: Jul. 10, 2015

(87) PCT Pub. No.: WO2014/112420
PCT Pub. Date: Jul. 24, 2014

(65) Prior Publication Data
US 2015/0357636 A1  Dec. 10, 2015

(30) Foreign Application Priority Data

Jan. 17, 2013  (JP) .................................. 2013-006293
Nov. 26, 2013  (JP) .................................. 2013-243806

(51) Int. Cl.
*H01M 4/36*  (2006.01)
*H01M 4/525*  (2010.01)
(Continued)

(52) U.S. Cl.
CPC ............ *H01M 4/366* (2013.01); *H01M 4/525* (2013.01); *H01M 4/60* (2013.01); *H01M 10/052* (2013.01);
(Continued)

(58) Field of Classification Search
CPC ........ H01M 4/366; H01M 4/525; H01M 4/60; H01M 10/052; H01M 10/0566; H01M 2004/028; Y02E 60/122; Y02T 10/7011
See application file for complete search history.

(56) References Cited

U.S. PATENT DOCUMENTS 4,608,322 A  8/1986  Howard et al.
7,066,971 B1  6/2006  Carlson
(Continued)

FOREIGN PATENT DOCUMENTS

EP  1443586 A2  8/2004
JP  08-236114  9/1996
(Continued)

OTHER PUBLICATIONS

International Search Report issued in connection with International Patent Application No. PCT/JP2014/050188, dated Apr. 15, 2014. (1 page).
(Continued)

*Primary Examiner* — Brittany Raymond
(74) *Attorney, Agent, or Firm* — K&L Gates LLP

(57) ABSTRACT

A secondary battery includes: a cathode; an anode; and an electrolytic solution. The cathode contains an active material capable of inserting and extracting an electrode reactant. A ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry. Since a
(Continued)

secondary battery according to the present invention has an intensity ratio IS/IF of 0.04 or more as obtained by a negative ion analysis of the active material using time-of-flight secondary ion mass spectrometry, the secondary battery is able to achieve excellent battery characteristics.

16 Claims, 7 Drawing Sheets

(51) Int. Cl.
    *H01M 4/60*     (2006.01)
    *H01M 10/052*     (2010.01)
    *H01M 10/0566*     (2010.01)
    *H01M 10/058*     (2010.01)
    *H01M 4/02*     (2006.01)

(52) U.S. Cl.
    CPC ..... *H01M 10/058* (2013.01); *H01M 10/0566* (2013.01); *H01M 2004/028* (2013.01); *Y02E 60/122* (2013.01); *Y02T 10/7011* (2013.01)

(56) References Cited

U.S. PATENT DOCUMENTS

| | | | | |
|---|---|---|---|---|
| 2005/0153209 | A1* | 7/2005 | Vallee | H01M 2/1653 429/314 |
| 2009/0169985 | A1 | 7/2009 | Yamaguchi et al. | |
| 2012/0265385 | A1* | 10/2012 | Funada | H01M 10/0525 701/22 |
| 2012/0315548 | A1* | 12/2012 | Fujikawa | H01M 4/134 429/330 |
| 2012/0326500 | A1 | 12/2012 | Hirose et al. | |

FOREIGN PATENT DOCUMENTS

| | | |
|---|---|---|
| JP | 10-289733 | 10/1998 |
| JP | 3172388 | 6/2001 |
| JP | 2002-100357 | 4/2002 |
| JP | 2002-352864 | 12/2002 |
| JP | 2004-165151 | 10/2004 |
| JP | 3691279 | 9/2005 |
| JP | 2006-294375 | 10/2006 |
| JP | 2007-522616 | 8/2007 |
| JP | 2009-176719 | 8/2009 |
| JP | 2010-129449 | 10/2010 |
| JP | 2010-225498 | 10/2010 |
| JP | 2010-245017 | 10/2010 |
| JP | 2011-513924 | 4/2011 |
| JP | 2011-150958 | 8/2011 |
| JP | 2013-008586 | 1/2013 |
| WO | 85/01614 A1 | 4/1985 |

OTHER PUBLICATIONS

Japanese Office Action dated Feb. 14, 2017 in corresponding Japanese application No. 2013-243806 (4 pages).
Extended European Search Report issued Aug. 24, 2016 in corresponding European application No. 14740333.1 (9 pages).

* cited by examiner

[ FIG. 1 ]
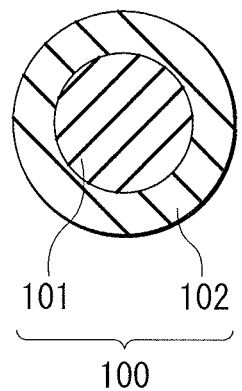

[FIG. 2]
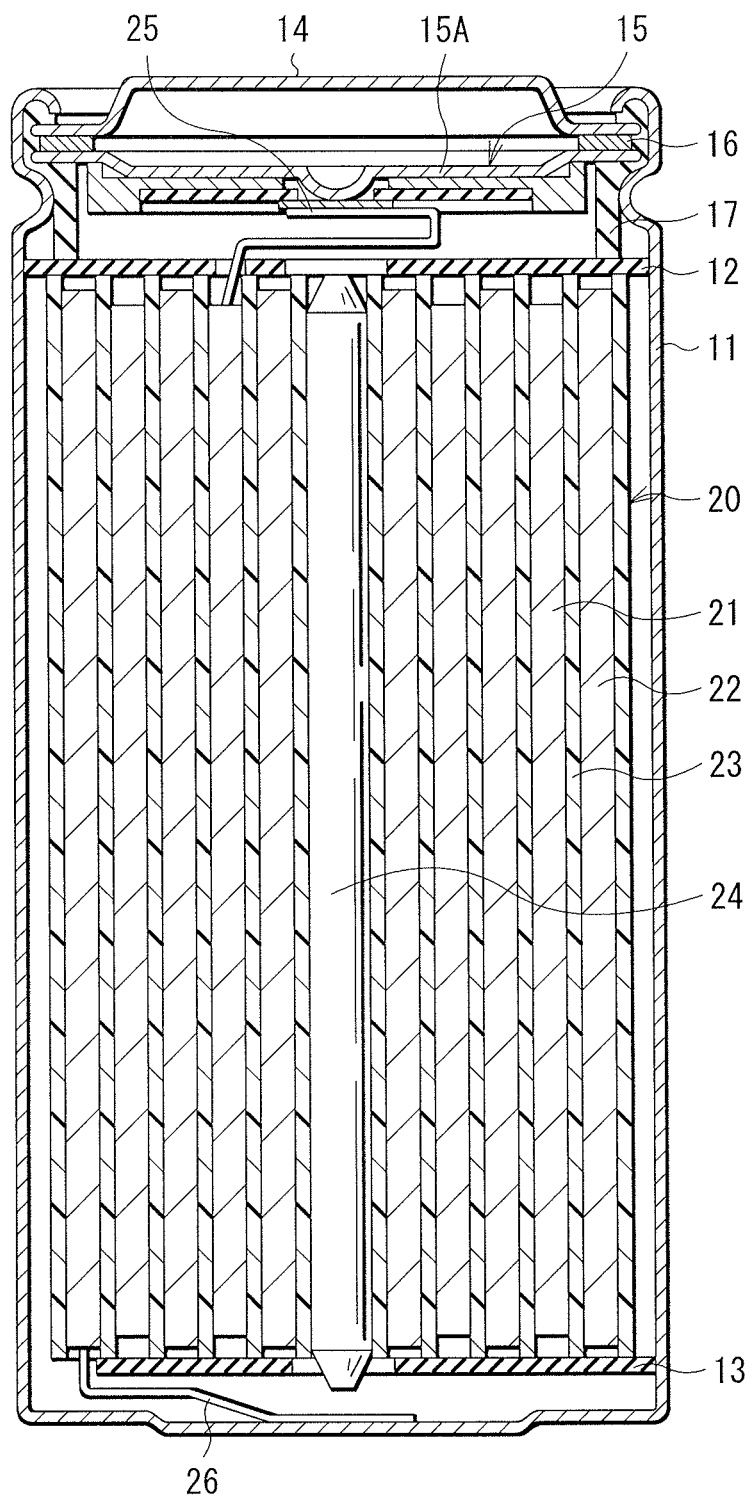

[ FIG. 3 ]
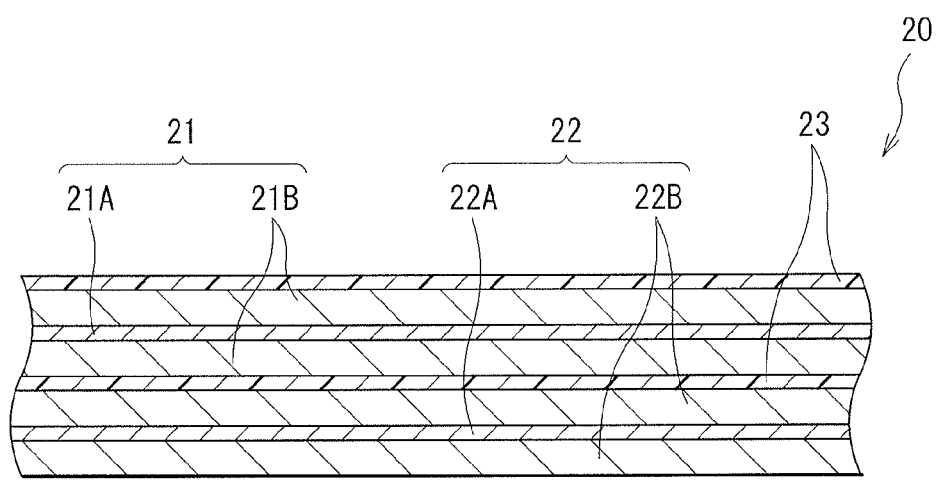

[ FIG. 4 ]
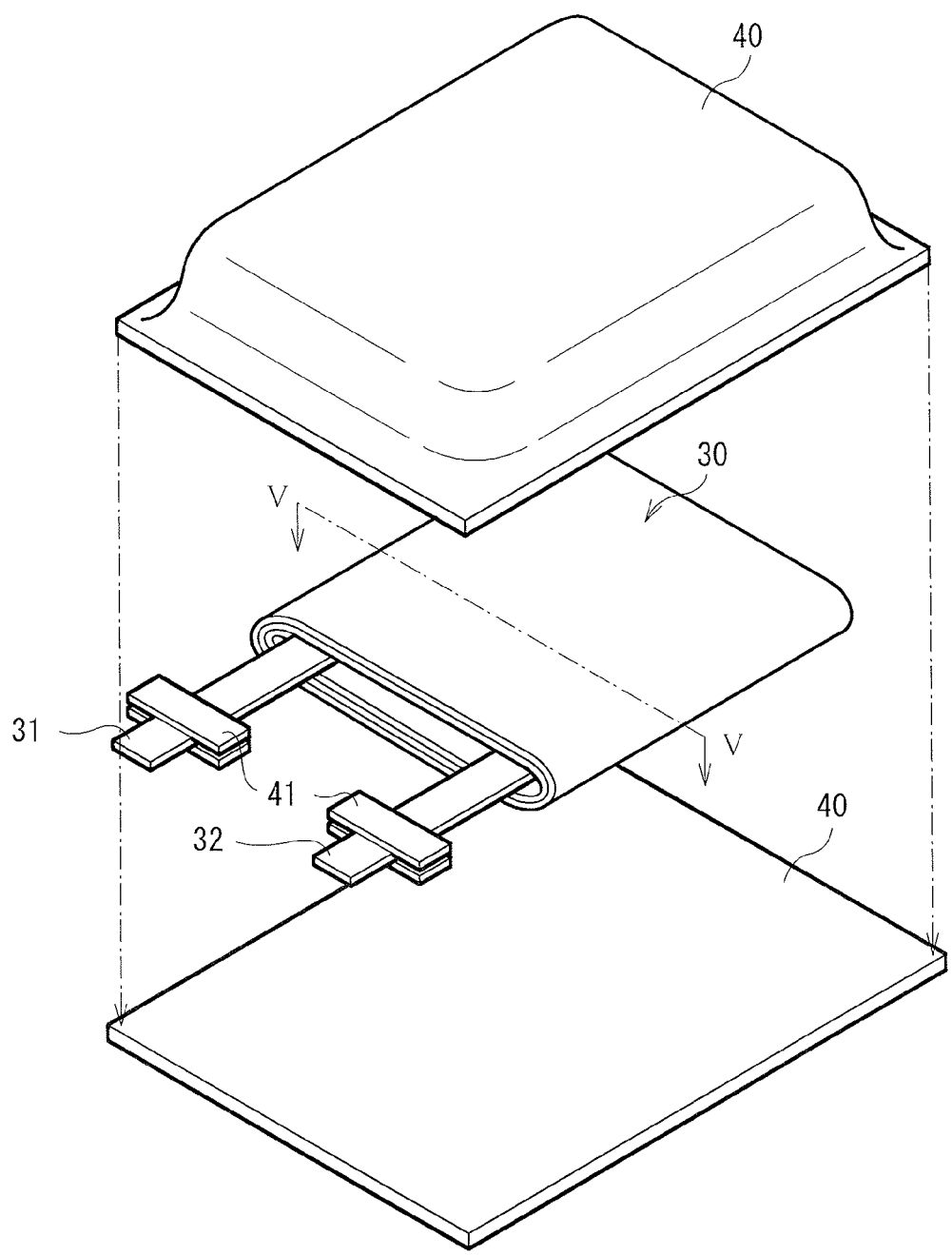

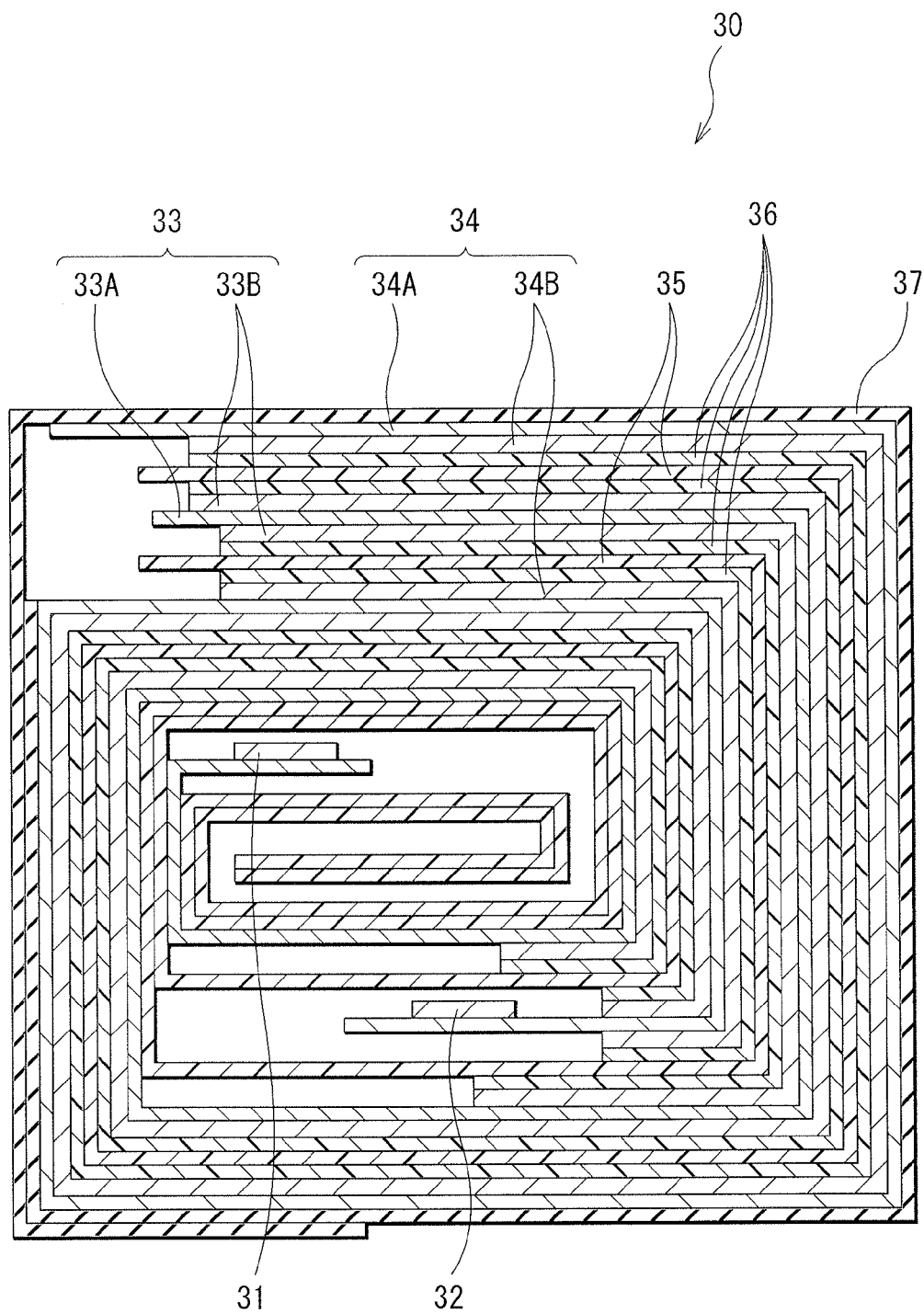
[ FIG. 5 ]

[ FIG. 6 ]
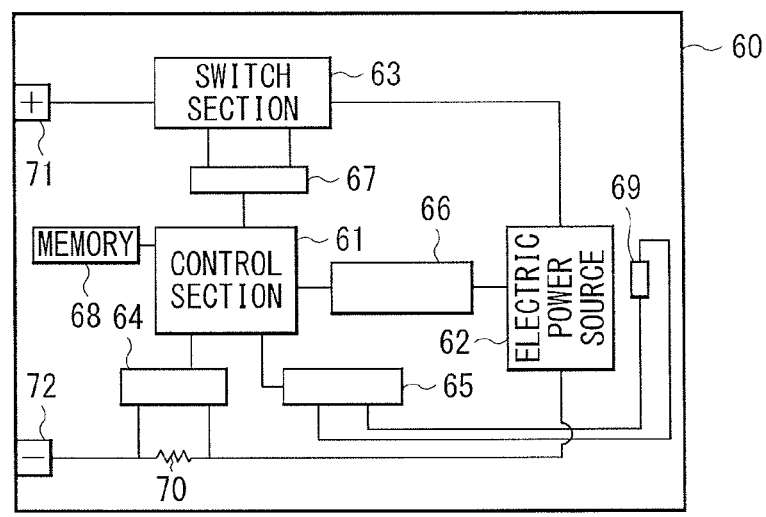
[ FIG. 7 ]
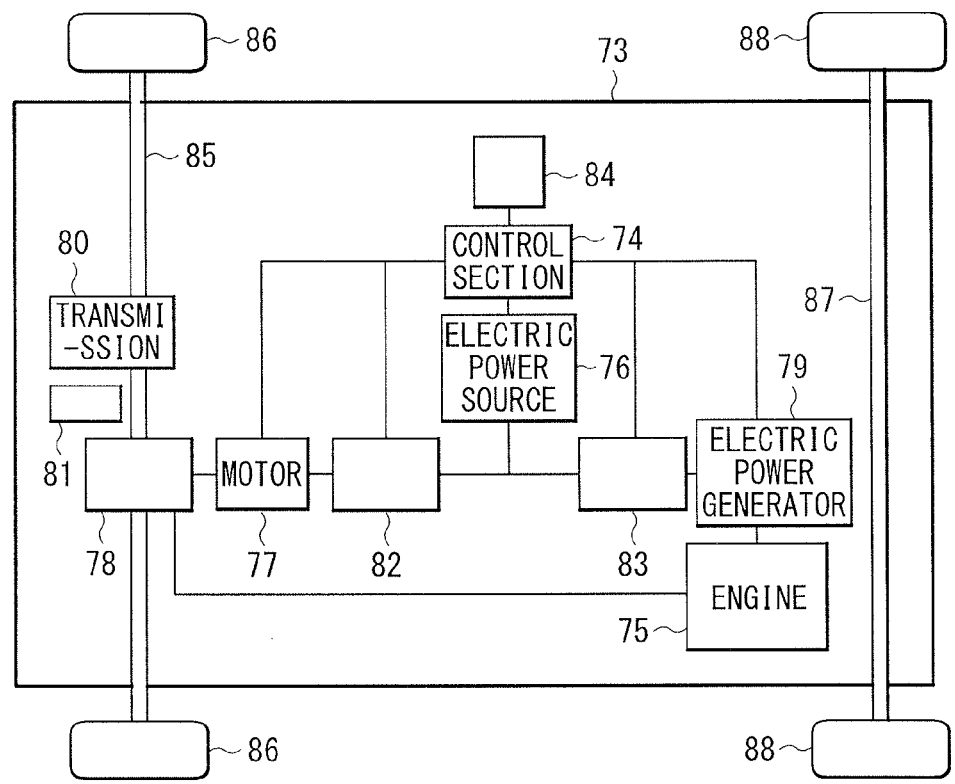

[ FIG. 8 ]
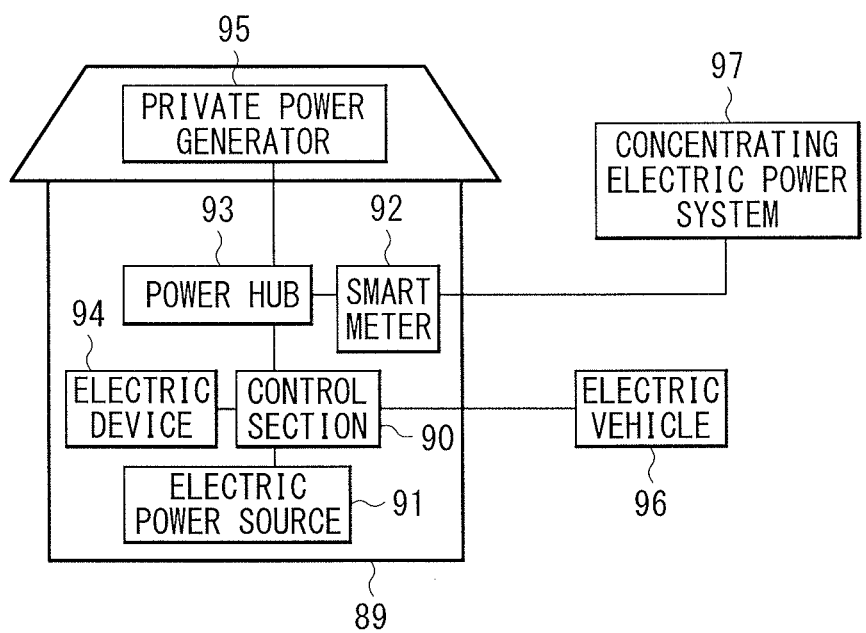
[ FIG. 9 ]
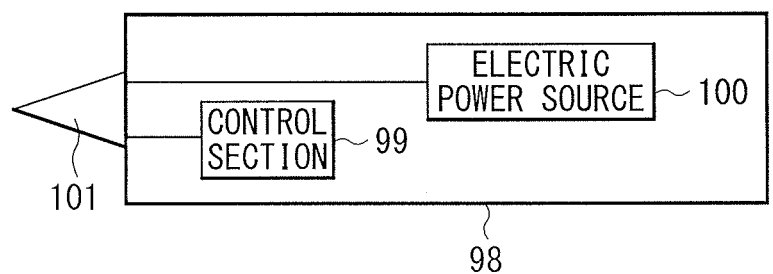

SECONDARY BATTERY-USE ACTIVE MATERIAL, SECONDARY BATTERY-USE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application is a national stage of International Application No. PCT/JP2014/050188 filed on Jan. 9, 2014 and claims priority to Japanese Patent Application No. 2013-006293 filed on Jan. 17, 2013, and Japanese Patent Application No. 2013-243806 filed on Nov. 26, 2013, the disclosure of which is incorporated herein by reference.

BACKGROUND

The present technology relates to a secondary battery-use active material capable of inserting and extracting an electrode reactant, to a secondary battery-use electrode and a secondary battery that use the secondary battery-use active material, and to a battery pack, an electric vehicle, an electric power storage system, an electric power tool, and an electronic apparatus that use the secondary battery.

Electronic apparatuses such as a mobile phone and a personal digital assistant (PDA) have been widely used, and it has been demanded to further reduce the size and the weight of the electronic apparatuses and to achieve their long life. Accordingly, as an electric power source for the electronic apparatuses, a battery, in particular, a small and light-weight secondary battery capable of providing high energy density has been developed.

In these days, it has been considered to apply such a secondary batter not only to the foregoing electronic apparatuses, but also to various applications. Examples of such other applications may include a battery pack attachably and detachably mounted on the electronic apparatuses or the like, an electric vehicle such as an electric automobile, an electric power storage system such as a home electric power server, and an electric power tool such as an electric drill, and various applications other than the foregoing applications are considered.

Secondary batteries utilizing various charge-discharge principles to obtain a battery capacity have been proposed. In particular, a secondary battery utilizing insertion and extraction of an electrode reactant or a secondary battery utilizing precipitation and dissolution of an electrode reactant has attracted attention, since such a secondary battery provides higher energy density than lead batteries, nickel-cadmium batteries, and the like.

The secondary battery includes a cathode, an anode, and an electrolytic solution. The cathode contains an active material (cathode active material) capable of inserting and extracting an electrode reactant. As the cathode active material, in general, an oxide (lithium composite oxide) containing lithium (Li) and one or more transition metal elements as components is widely used.

Various studies have been made on configurations of cathodes containing cathode active materials according to various purposes. Specifically, in order to improve charge-discharge cycle characteristics, a coat of a metal oxide such as magnesium oxide (MgO) is formed on the surface of a cathode containing a lithium-transition metal composite oxide ($Li_xNi_{1-y}Co_yO_z$) (For example, see Patent Literature 1). In order to improve structural stability and thermal stability of a cathode active material, the surface of the cathode active material ($LiA_{1-x-y}B_xC_yO_2$: A represents Co or the like, B represents Ni or the like, and C represents Mg or the like) is coated with a metal oxide such as an oxide of magnesium (Mg) (for example, see Patent Literature 2). In order to improve capacity, charge-discharge cycle durability, safety, and the like, lithium-nickel-manganese-M composite oxide ($Li_xNi_yMn_{1-y-z}M_zO_2$: M is Fe or the like) and lithium-cobalt composite oxide ($Li_xCoO_2$) are mixed (for example, see Patent Literature 3).

In addition thereto, various studies have been made on configurations of secondary batteries. Specifically, in order to obtain high safety during exposure to high temperature or during storage, lithium bis(fluorosulfonyl)imide (LiFSI) is used as a solvent of an electrolytic solution (for example, see Patent Literatures 4 and 5). In order to easily fabricate an electrochemical system including a polyether/lithium salt electrolyte, a non-solvating polymer and a polar aprotic compound such as sulfamide are used as binders (for example, see Patent Literature 6).

Moreover, various measures have been taken to improve characteristics of secondary batteries. Specifically, in order to improve charge-discharge cycle characteristics and the like, a completed secondary battery is stored in a charged state (for example, see Patent Literatures 7 and 8). In order to manufacture an electrode that is cost effective and environmentally friendly, lithium bis(trifluoro methanesulfonyl) imide (LiTFSI) is contained in an aqueous solution/suspension for electrode formation (for example, see Patent Literature 9). In order to improve reliability in a high-temperature and high-humidity environment, a mixture of a cathode active material (manganese oxide) and an electric conductor is subjected to heat treatment in an organic solvent containing imidazole and LiFSI (for example, see Patent Literature 10). In order to improve decomposition of an electrolytic solution at a high potential, and the like, an electrode is soaked in a pretreatment electrolytic solution in which lithium salt (LiTFSI) is dissolved in an organic solvent containing a nitrile compound, and then a positive voltage is applied to the electrode in such an soaked state (for example, see Patent Literature 11). In order to improve cycle characteristics and the like, an electrolytic solution contains LiTFSI (for example, see Patent Literatures 12 and 13).

CITATION LIST

Patent Literature

Patent Literature 1: Japanese Patent No. 3172388
Patent Literature 2: Japanese Patent No. 3691279
Patent Literature 3: Japanese Unexamined Patent Application Publication No. 2002-100357
Patent Literature 4: Japanese Unexamined Patent Application Publication No. 2004-165151
Patent Literature 5: Japanese Unexamined Patent Application Publication No. 2010-129449
Patent Literature 6: Japanese Unexamined Patent Application Publication (Published Japanese Translation of PCT Application) No. 2007-522616
Patent Literature 7: Japanese Unexamined Patent Application Publication No. H10-289733
Patent Literature 8: Japanese Unexamined Patent Application Publication No. 2002-352864

Patent Literature 9: Japanese Unexamined Patent Application Publication (Published Japanese Translation of PCT Application) No. 2011-513924
Patent Literature 10: Japanese Unexamined Patent Application Publication No. 2010-225498
Patent Literature 11: Japanese Unexamined Patent Application Publication No. 2010-245017
Patent Literature 12: Japanese Unexamined Patent Application Publication No. 2011-150958
Patent Literature 13: Japanese Unexamined Patent Application Publication No. 2006-294375

SUMMARY

Since high performance and multi-functions of the electronic apparatuses and the like to which secondary batteries are applied have been increasingly achieved, and frequency in use of the electronic apparatuses and the like has been increased as well, further improvement of the battery characteristics of the secondary batteries has been desired.

Therefore, it is desirable to provide a secondary battery-use active material, a secondary battery-use electrode, a secondary battery, a battery pack, an electric vehicle, an electric power storage system, an electric power tool, and an electronic apparatus that are capable of obtaining superior battery characteristics.

A secondary battery-use active material according to an embodiment of the present technology is capable of inserting and extracting an electrode reactant, and a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry.

A secondary battery-use electrode according to an embodiment of the present technology includes an active material capable of inserting and extracting an electrode reactant, and the active material has a configuration similar to that of the secondary battery-use active material according to the above-described embodiment of the present technology. A secondary battery according to an embodiment of the present technology includes: a cathode; an anode; and an electrolyte solution, and the cathode has a configuration similar to that of the secondary battery-use electrode according to the above-described embodiment of the present technology. A battery pack, an electric vehicle, an electric power storage system, an electric power tool, and an electronic apparatus according to embodiments of the present technology each include a secondary battery, and the secondary battery has a configuration similar to that of the secondary battery according to the above-described embodiment of the present technology.

According to the secondary battery-use active material, the secondary battery-use electrode, or the secondary battery according to the embodiment of the present technology, the intensity ratio IS/IF obtained by negative ion analysis on the active material with use of time-of-flight secondary ion mass spectrometry is 0.04 or more; therefore, superior battery characteristics are obtainable. Moreover, in the battery pack, the electric vehicle, the electric power storage system, the electric power tool, or the electronic apparatus according to the embodiment of the present technology, a similar effect is obtainable.

BRIEF DESCRIPTION OF THE FIGURES

FIG. 1 is a cross-sectional view illustrating a configuration of a secondary battery-use active material according to an embodiment of the present technology.

FIG. 2 is a cross-sectional view illustrating configurations of a secondary battery-use electrode and a secondary battery (cylindrical-type) that use the secondary battery-use active material according to the embodiment of the present technology.

FIG. 3 is a cross-sectional view illustrating an enlarged part of a spirally wound electrode body illustrated in FIG. 2.

FIG. 4 is a perspective view illustrating configurations of another secondary battery-use electrode and another secondary battery (laminated-film-type) that use the secondary battery-use active material according to the embodiment of the present technology.

FIG. 5 is a cross-sectional view taken along a line V-V of a spirally wound electrode body illustrated in FIG. 4.

FIG. 6 is a block diagram illustrating a configuration of an application example (a battery pack) of the secondary battery.

FIG. 7 is a block diagram illustrating a configuration of an application example (an electric vehicle) of the secondary battery.

FIG. 8 is a block diagram illustrating a configuration of an application example (an electric power storage system) of the secondary battery.

FIG. 9 is a block diagram illustrating a configuration of an application example (an electric power tool) of the secondary battery.

DETAILED DESCRIPTION

Some embodiments of the present technology will be described in detail below referring to the accompanying drawings. It is to be noted that description will be given in the following order.
1. Secondary Battery-use Active Material
2. Application Example of Secondary Battery-use Active Material
   2-1. Secondary Battery-Use Electrode and Secondary Battery (Cylindrical-type Lithium-ion Secondary Battery)
   2-2. Secondary Battery-Use Electrode and Secondary Battery (Laminated-film-type Lithium-ion Secondary Battery)
   2-3. Secondary Battery-Use Electrode and Secondary Battery (Lithium-metal Secondary Battery)
3. Applications of Secondary Battery
   3-1. Battery Pack
   3-2. Electric Vehicle
   3-3. Electric Power Storage System
   3-4. Electric Power Tool
   (1. Secondary Battery-Use Active Material)
A secondary battery-use active material (hereinafter simply referred to as "active material" as well) according to an embodiment of the present technology is used for an electrode of a secondary battery. The secondary battery may be, for example, a lithium secondary battery or the like. The active material described here may be used, for example, as a cathode active material or as an anode active material.

[Physical Properties of Active Material]

The active material is capable of inserting and extracting an electrode reactant. This electrode reactant is a material movable between electrodes at the time of electrode reaction, and may be, for example, lithium of a lithium secondary battery, or the like.

Specifically, when negative ion analysis is performed on the active material with use of time-of-flight secondary ion mass spectrometry, an intensity ratio of peaks derived from specific two negative ions and obtained by the negative ion analysis satisfies a specific condition. This time-of-flight secondary ion mass spectrometry is so-called TOF-SIMS.

More specifically, attention is focused on a peak derived from a negative ion ($SO_2^-$) containing sulfur (S) as a constituent element and a peak derived from a negative ion ($LiF_2^-$) containing fluorine (F) as a constituent element. In this case, an intensity ratio IS/IF of these two peaks is 0.04 or more, where the intensity of the peak derived from $SO_2^-$ represents IS, and the intensity of the peak derived from $LiF_2^-$ represents IF.

The peak derived from $SO_2^-$ is mainly a peak derived from a sulfonyl group ($>SO_2$) present on a surface of the active material and in the vicinity thereof, and the larger the intensity IS of the peak is, the more decomposition reaction of an electrolytic solution used in a secondary battery together with the active material is suppressed. One reason for this is that, in the active material, a main portion (a central portion) that inserts and extracts the electrode reactant is coated with a surface portion including the sulfonyl group; therefore, even if the central portion is activated at the time of electrode reaction, the main portion is chemically protected. Thus, chemical stability of the active material is improved; therefore, even if the electrode reaction is repeated, the electrolytic solution is less likely to be decomposed.

Additional features and advantages are described herein, and will be apparent from the following Detailed Description and the figures.

In TOF-SIMS, a composition (ionic species and a ratio thereof) in the vicinity of the surface of a test sample (herein, the active material) is measured. Therefore, detection of the peak derived from $SO_2^-$ by negative ion analysis on the active material means that a sulfonyl group from which the $SO_2^-$ is derived is present in the vicinity of the surface of the active material.

On the other hand, the peak derived from $LiF_2^-$ is mainly a peak derived from another material (for example, electrolyte salt and its decomposition product) or the like used in the secondary battery together with the active material, and the smaller the intensity IF of the peak is, the more electrical resistance of the active material is decreased. One reason for this is that, since the abundance of fluorine in the surface of the active material and in the vicinity thereof is decreased, an inert material such as lithium fluoride (LiF) causing an increase in resistance is less likely to be produced. The inert material may impair insertion and extraction of the electrode reactant; therefore, when the abundance of fluorine is decreased, insertion and extraction of the electrode reactant is less likely to be impaired.

One reason why the intensity ratio IS/IF is 0.04 or more is that since balance between intensities IS and IF of the above-described two peaks is made appropriate, both suppression of decomposition reaction of the electrolytic solution and suppression of an increase in electrical resistance of the active material are achieved. Specifically, when the intensity ratio IS/IF is too small (IS/IF<0.04), the amount of the central portion coated with the surface portion having the sulfonyl group is insufficient, or the abundance of fluorine causing production of the inert material is excessive. Therefore, even though the sulfonyl group is present on the surface of the active material and in the vicinity thereof, a function of suppressing decomposition of the electrolyte solution is not fulfilled, or electrical resistance of the active material is considerably increased. On the other hand, when the intensity ratio IS/IF is within an appropriate range (IS/IF≥0.04), the amount of the central portion coated with the surface portion having the sulfonyl group is secured, and the abundance of fluorine is lowered. Therefore, decomposition reaction of the electrolytic solution is less likely to occur, and electrical resistance of the active material is less likely to be increased.

This intensity ratio IS/IF is determined by an analysis result of negative ion analysis using a TOF-SIMS apparatus. Specifically, first, negative ion analysis is performed on the active material to obtain a TOF-SIMS spectrum including a plurality of peaks derived from negative ions (horizontal axis=mass and vertical axis=intensity). Subsequently, the peak derived from $SO_2^-$ and the peak derived from $LiF_2^-$ are specified from the plurality of peaks, and the intensities IS and IF of the respective peaks are determined Finally, the intensity ratio IS/IF=the intensity IS of the peak derived from $SO_2^-$/the intensity IF of the peak derived from $LiF_2^-$ is determined by calculation.

The TOF-SIMS apparatus used here to measure the intensities IS and IF may be a TOF-SIMS V manufactured by ION-TOF GmbH. Moreover, as measurement conditions, a primary ionic species is $Bi^{3+}$, an ion gun accelerating voltage is 25 kV, an ionic current is 0.3 pA, a pulse width is 15.2 ns, a pulse frequency is 10 kHz (in high-mass resolution measurement) or 20 kHz (in high-spatial resolution measurement), and a scanning range is 200 μm square (in high-mass resolution measurement) or 60 μm square (in high-spatial resolution measurement).

[Configuration of Active Material]

As long as this active material is capable of inserting and extracting an electrode reactant and has the intensity ratio IS/IF satisfying the above-described condition, the active material may have any configuration.

FIG. 1 illustrates a cross-sectional configuration of an active material 100. This active material 100 may include, for example, a central section 101 capable of inserting and extracting an electrode reactant and a coating section 102 provided on the central section 101.

[Central Portion]

The central section 101 is a main portion (an inner portion) present inside the active material 100, and includes one or more electrode materials capable of inserting and extracting an electrode reactant.

The kind of the electrode material is not specifically limited, as long as the electrode material is capable of inserting and extracting an electrode active material. The electrode material may be preferably a compound containing lithium (Li) as a constituent element (a lithium-containing compound), since thereby, high energy density is obtained. Examples of the lithium-containing compound may include, in addition to a lithium composite oxide, a lithium phosphate compound, and a lithium sulfide, an intercalation compound containing lithium. The lithium composite oxide is an oxide containing lithium and one or more transition metal elements as constituent elements, and the lithium phosphate compound is a phosphate compound containing lithium and one or more transition metal elements as constituent elements.

In particular, the lithium-containing compound may be preferably the lithium composite oxide and the lithium phosphate compound, since thereby, higher energy density is stably obtained.

The lithium composite oxide may be a compound with an average composition represented by one of the following formulas (11) to (13), and may have a so-called layered rock-salt crystal structure.

$$Li_{a1}Ni_{(1-b1-c1)}Mn_{b1}M1_{c1}O_{(2-d1)}X_{e1} \quad (11)$$

where M1 is one or more selected from the group configured of Group 2 to 15 elements (except for Ni and Mn) in the long form of the periodic table of the elements, X is one or more selected from the group configured of Group 16 and 17 elements (except for O) in the long form of the periodic table of the elements, a1, b1, c1, d1, and e1 satisfy 0≤a1≤1.5, 0≤b1≤1, 0≤c1≤1, −0.1≤d1≤0.2, and 0≤e1≤0.2, and the composition (molar ratio) of Li varies according to charge and discharge states, and the value of a1 is a value in a completely-discharged state.

$$Li_{a2}Co_{(1-b2)}M2_{b2}O_{(2-c2)} \quad (12)$$

where M2 is one or more selected from the group configured of V, Cu, Zr, Zn, Mg, Al, Ga, Y, and Fe, a2, b2, and c2 satisfy 0.9≤a2≤1.1, 0≤b2≤0.3, and −0.1≤c2≤0.1, and it is to be noted that the composition (molar ratio) of Li varies according to charge and discharge states, and the value of a2 is a value in a completely-discharged state.

$$Li_{a3}Ni_{b3}Co_{c3}Mn_{d3}M3_{(1-b3-c3-d3)}O_{(2-e3)} \quad (13)$$

where M3 is one or more selected from the group configured of V, Cu, Zr, Zn, Mg, Al, Ga, Y, and Fe, a3, b3, c3, d3, and e3 satisfy 0.9≤a3≤1.1, 0≤b3≤1, 0≤c3≤1, 0≤d3≤0.5, −0.1≤e3≤0.1, and 0≤1−b3−c3−d3, and it is to be noted that the composition (molar ratio) of Li varies according to charge and discharge states, and the value of a3 is a value in a completely-discharged state.

Specific examples of the lithium composite oxide with the layered rock-salt crystal structure may include lithium cobalt oxide (LiCoO$_2$), lithium nickel oxide (LiNiO$_2$), and nickel-cobalt-manganese lithium composite oxide (LiCoNiO$_2$), and may include compounds other than them. In particular, the lithium composite oxide may preferably include cobalt (Co) as a transition metal element, since thereby, a high discharge voltage is obtained.

Moreover, the lithium composite oxide may be, for example, a compound with an average composition represented by the following formula (14), and may have a so-called spinel crystal structure.

$$Li_{a4}Mn_{(2-b4)}M4_{b4}O_{c4}F_{d4} \quad (14)$$

where M4 is one or more selected from the group configured of Co, Ni, Mg, Al, B, Ti, V, Cr, Fe, Cu, Zn, Mo, Sn, Ca, Sr, and W, a4, b4, c4, and d4 satisfy 0.9≤a4≤1.1, 0≤b4≤0.6, 3.7≤c4≤4.1, and 0≤d4≤0.1, and it is to be noted that the composition (molar ratio) of Li varies according to charge and discharge states, and the value of a4 is a value in a completely-discharged state.

Specific examples of the lithium composite oxide with the spinel crystal structure may include lithium manganese oxide (LiMn$_2$O$_4$), and may include a compound other than lithium manganese oxide.

The lithium phosphate compound may be a compound with an average composition represented by one of the following formulas (15) and (16), and may have an olivine crystal structure.

$$Li_{a5}M5_{b5}PO_4 \quad (15)$$

where M5 is one or more selected from the group configured of Group 2 to 15 elements in the long form of the periodic table of the elements, and a5 and b5 satisfy 0≤a5≤2 and 0.5≤b5≤2.

$$Li_{a6}M6PO_4 \quad (16)$$

where M6 is one or more selected from the group configured of Co, Mn, Fe, Ni, Mg, Al, B, Ti, V, Nb, Cu, Zn, Mo, Ca, Sr, W, and Zr, a6 satisfies 0.9≤a6≤1.1, and it is to be noted that the composition (molar ratio) of Li varies according to charge and discharge states, and the value of a6 is a value in a completely-discharged state.

Specific examples of the lithium phosphate compound with the olivine crystal structure may include lithium iron phosphate (LiFePO$_4$), and may include a compound other than lithium iron phosphate.

In the lithium composite oxides and the lithium phosphate compounds, the lithium composite oxide with the layered rock-salt crystal structure may be preferable, since thereby, high energy density is obtained.

In the foregoing lithium-containing compounds, part of constituent elements may be substituted by one or more selected from the group configured of Group 2 to 15 elements in the long form of the periodic table of the elements, or the foregoing lithium-containing compounds may be subjected to fluorination treatment.

In addition thereto, examples of the electrode material may include one or more of an oxide, a bisulfide, a chalcogenide, and an electrically-conductive polymer. Examples of the oxide may include titanium oxide, vanadium oxide, and manganese dioxide. Examples of the bisulfide may include titanium bisulfide and molybdenum sulfide. Examples of the chalcogenide may include niobium selenide. Examples of the electrically-conductive polymer may include sulfur, polyaniline, and polythiophene.

It is to be noted that the central section 101 (for example, the foregoing lithium-containing compound) may include, on its surface, one or more elements (hereinafter referred to as "coating elements") different from the transition metal element forming the lithium-containing compound, since thereby, electrochemical stability of the active material 100 is improved.

The kind of the coating element is not specifically limited, but may be preferably an element different from a transition metal element (a so-called main transition metal element) contained in the lithium-containing compound. The main transition metal element is one transition metal element contained at the largest content ratio (molar ratio) in transition metal elements contained in the lithium-containing compound. As an example, in the case where the lithium-containing compound is LiCo$_{0.98}$Al$_{0.01}$Mg$_{0.01}$O$_2$, the main transition metal element is Co. Accordingly, the coating element may be one or more of elements other than Co. Specific examples of the coating element may include nickel (Ni), manganese (Mn), and phosphorus (P).

[Covering Section]

The coating section 102 is provided on at least part of a surface of the central section 101. Therefore, the coating section 102 may be provided on the entire surface of the central section 101 or only part of the surface of the central section 101. In the latter case, the coating section 102 may be scattered in a plurality of locations on the surface of the central section 101.

The coating section 102 may include, for example, one or more compounds having a sulfonyl group (>SO$_2$) (hereinafter referred to as "sulfonyl compounds"). One reason for this is that when the sulfonyl group is present on the surface of the central section 101, the central section 101 is chemically protected as described above, thereby improving chemical stability of the active material 100. This sulfonyl compound may have only one sulfonyl group, or two or more sulfonyl groups.

As long as this sulfonyl compound has one or more sulfonyl groups as described above, any sulfonyl compound may be adopted. Specifically, the sulfonyl compound may include one or more selected from the group configured of compounds represented by the following formulas (1) to (4).

[Chem. 1]

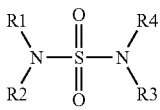
(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 may be bound to one another.

[Chem. 2]

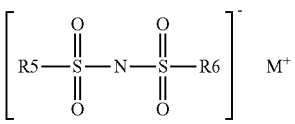
(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 may be bound to each other, and M is a metal element.

[Chem. 3]

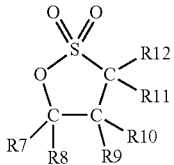
(3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R7 to R12 may be bound to one another.

[Chem. 4]

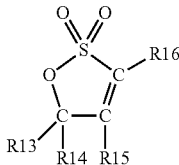
(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 may be bound to one another.

The compound represented by the formula (1) is a chain compound having one sulfonyl group. The compound represented by the formula (2) is a chain compound having two sulfonyl groups. The compound represented by the formula (3) is a cyclic compound having one sulfonyl group, and not having an unsaturated bond (a carbon-carbon double bond) in a ring. The compound represented by the formula (4) is a cyclic compound having one sulfonyl group, and having an unsaturated bond (a carbon-carbon double bond) in a ring.

In particular, the compounds represented by the formulas (1) and (2) each have a nitrogen bond (>N—) together with the sulfonyl group. A sulfur atom (S) and a nitrogen bond (a nitrogen atom (N)) in the sulfonyl group may be bound to each other or may not be bound to each other. In particular, the sulfur atom and the nitrogen bond may be preferably bound to each other, since thereby, a higher effect is obtained.

Details of R1 to R16 and M represented in the formulas (1) to (4) are as follows.

As long as each of R1 to R4 in the formula (1) is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R1 to R4 are not specifically limited. One reason for this is that as long as the sulfonyl compound has a chemical structure represented by the formula (1), the foregoing advantages are obtainable without depending on the kinds of R1 to R4.

It is to be noted that R1 to R4 may be groups of a same kind or groups of different kinds, and any two or more of R1 to R4 may be groups of a same kind. Moreover, any two or more of R1 to R4 may be bound to one another, and a ring may be formed with the bound groups.

The hydrocarbon group is a generic name of a monovalent group configured of carbon (C) and hydrogen (H), and may have a straight-chain structure or a branched structure with one or more side chains. The hydrocarbon group may be an unsaturated hydrocarbon group having a carbon-carbon multiple bond (a carbon-carbon double bond or a carbon-carbon triple bond) or a saturated hydrocarbon group not having the carbon-carbon multiple bond.

Specific examples of the hydrocarbon group may include an alkyl group, an alkenyl group, an alkynyl group, an aryl group, and a cycloalkyl group, and the number of carbon atoms are not specifically limited, since thereby, the foregoing advantages are obtainable without depending on the number of carbon atoms.

In particular, the number of carbon atoms in the alkyl group may be preferably 1 to 12, the number of carbon atoms in the alkenyl group and the alkynyl group may be preferably 2 to 12, the number of carbon atoms in the aryl group may be preferably 6 to 18, and the number of carbon atoms in the cycloalkyl group may be preferably 3 to 18. Moreover, the number of carbon atoms in the alkyl group, the alkenyl group, and the alkynyl group may be more preferably 6 or less, and may be further preferably 4 or less, since thereby, superior solubility, superior compatibility, and the like are secured.

Examples of the alkyl group may include a methyl group (—$CH_3$), an ethyl group (—$C_2H_5$), and a propyl group (—$C_3H_7$). Examples of the alkenyl group may include a vinyl group (—CH=$CH_2$) and an allyl group (—$CH_2$—CH=$CH_2$). Examples of the alkynyl group may include an ethynyl group (—CCH). Examples of the aryl group may include a phenyl group and a naphthyl group. Examples of the cycloalkyl group may include a cyclopropyl group, a cyclobutyl group, a cyclopentyl group, a cyclohexyl group, a cycloheptyl group, and a cyclooctyl group.

Examples of the halogen group may include a fluorine group, a chlorine group, a bromine group, and an iodine group, and in particular, the fluorine group may be preferable, since thereby, a higher effect is obtained.

The halogenated hydrocarbon group is a group in which at least part of hydrogen groups contained in the foregoing hydrocarbon group are substituted by a halogen group (halogenated). The kind of the halogen group is as described above. Examples of the halogenated hydrocarbon group may include a trifluoromethyl group (—$CF_3$) and a pentafluoroethyl group (—$C_2F_5$).

The oxygen-containing hydrocarbon group is a generic name of a monovalent group configured of carbon, hydrogen, and oxygen (O). As with the foregoing hydrocarbon group, the oxygen-containing hydrocarbon group may have a straight-chain structure or a branched structure, and may have or may not have a carbon-carbon multiple bond.

Specific examples of the oxygen-containing hydrocarbon group may include an alkoxy group, and the number of carbon atoms in the oxygen-containing hydrocarbon group is not specifically limited, since thereby, the foregoing advantages are obtainable without depending on the number of carbon atoms. In particular, the number of carbon atoms in the alkoxy group may be preferably 1 to 18, more preferably 6 or less, and further preferably 4 or less, since thereby, superior solubility and superior compatibility, and the like are secured. Examples of the alkoxy group may include a methoxy group (—$OCH_3$), an ethoxy group (—$OC_2H_5$), and a propoxy group (—$OC_3H_7$).

The halogenated oxygen-containing hydrocarbon group is a group in which at least part of hydrogen groups contained in the above-described oxygen-containing hydrocarbon group are substituted by a halogen group. The kind of the halogen group is as described above. Examples of the halogenated oxygen-containing hydrocarbon group may include a trifluoromethoxy group (—$OCF_3$) and a pentafluoroethoxy group (—$OC_2F_5$).

The group obtained by binding two or more thereof is a group in which any two or more of the foregoing hydrogen group, the foregoing hydrocarbon group, the foregoing oxygen-containing hydrocarbon group, the foregoing halogen group, the foregoing halogenated hydrocarbon group, and the foregoing halogenated oxygen-containing hydrocarbon group are so bound as to form a monovalent group as a whole.

The kind of the group obtained by binding two or more thereof is not specifically limited. Examples of the group may include a group (a benzyl group) in which an aryl group and an alkyl group are bound, a group in which a cycloalkyl group and an alkyl group are bound, a group in which an alkoxy group and an alkyl group are bound, and a group in which two alkyl groups are bound with one ether group in between.

In addition thereto, each of R1 to R4 may be a group other than the foregoing groups. More specifically, each of R1 to R4 may be a derivative of one of the foregoing groups. The derivative is a group in which one or more substituent groups are introduced into one of the foregoing groups, and the kind of the substituent group may be arbitrarily selected.

It is to be noted that description of R1 to R4 in the formula (1) is also applicable to R5 and R6 in the formula (2), R7 to R12 in the formula (3), and R13 to R16 in the formula (4).

The kind of M in the formula (2) is not specifically limited, as long as M is a metal element. In particular, M may be preferably an alkali metal element, since thereby, a higher effect is obtained. Examples of the alkali metal element may include lithium (Li), sodium (Na), and potassium (K), and in particular, lithium may be preferable.

Specific examples of the compound represented by the formula (1) may include one or more selected from the group configured of compounds represented by the following formulas (1-1) to (1-13). Specific examples of the compound represented by the formula (2) may include one or more selected from the group configured of compounds represented by the following formulas (2-1) to (2-11).

[Chem. 5]

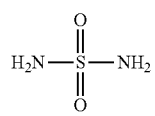

(1-1)

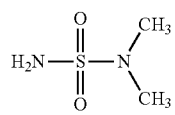

(1-2)

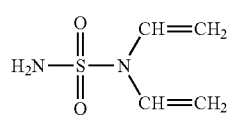

(1-3)

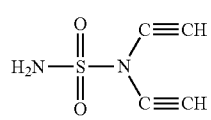

(1-4)

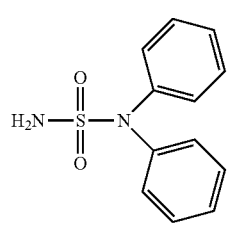

(1-5)

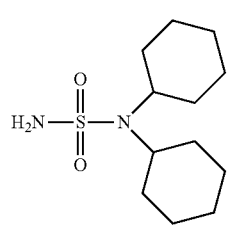

(1-6)

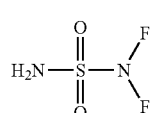

(1-7)

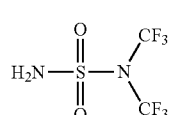

(1-8)

-continued (1-9) 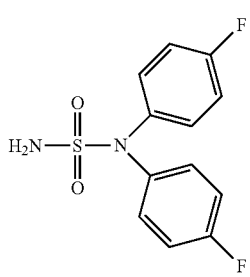

(1-10) 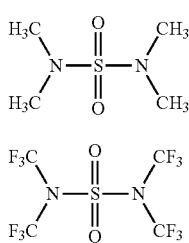

(1-11) 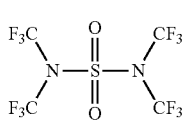

(1-12) 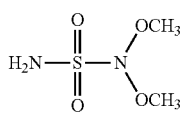

(1-13) 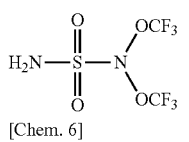

[Chem. 6]

(2-1) 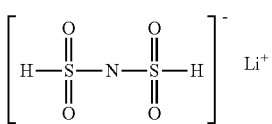

(2-2) 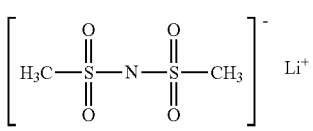

(2-3) 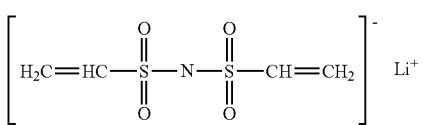

(2-4) 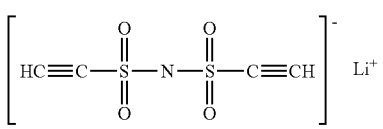

(2-5) 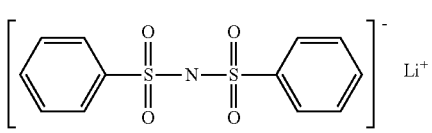

(2-6) 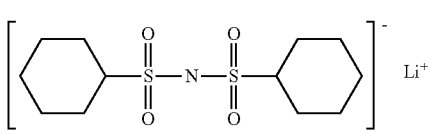

-continued (2-7) 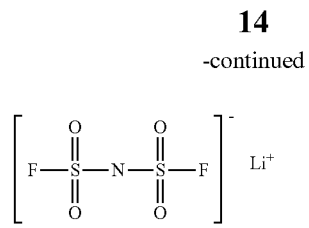

(2-8) 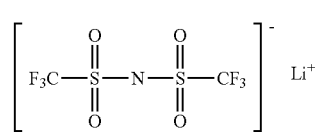

(2-9) 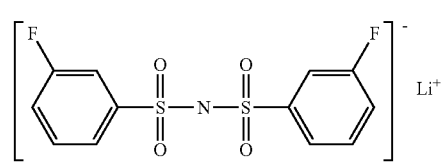

(2-10) 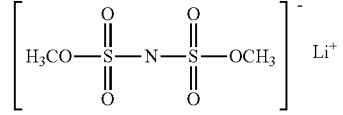

(2-11) 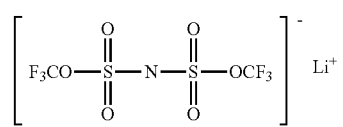

Specific examples of the compound represented by the formula (3) may include one or more selected from the group configured of compounds represented by the following formulas (3-1) to (3-11). Specific examples of the compound represented by the formula (4) may include one or more selected from the group configured of compounds represented by the following formulas (4-1) to (4-11).

[Chem. 7]

(3-1) 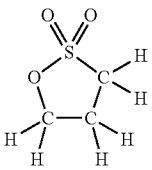

(3-2) 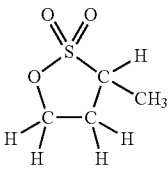

(3-3) 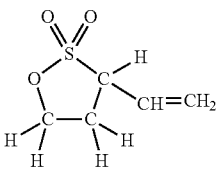

(3-4)
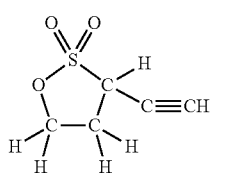
(3-5)
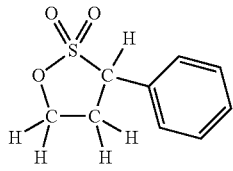
(3-6)
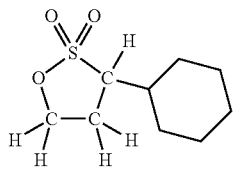
(3-7)
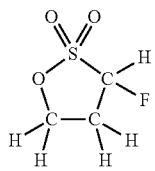
(3-8)
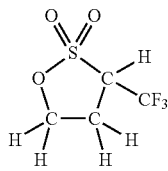
(3-9)
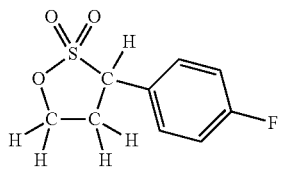
(3-10)
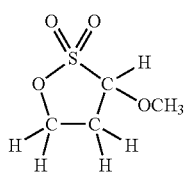
(3-11)
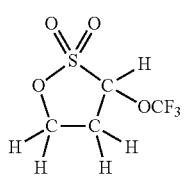
[Chem. 8]
(4-1)
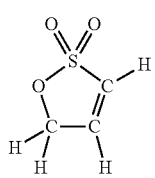
(4-2)
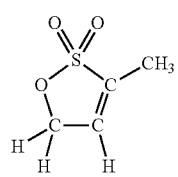
(4-3)
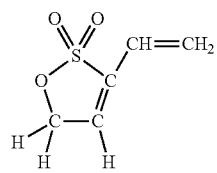
(4-4)
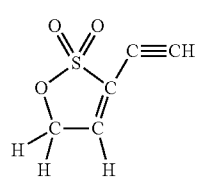
(4-5)
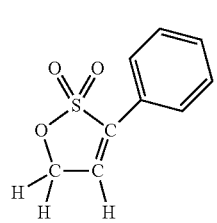
(4-6)
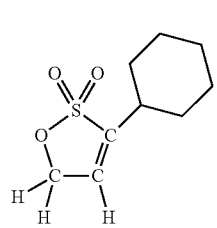
(4-7)
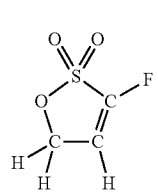
(4-8)
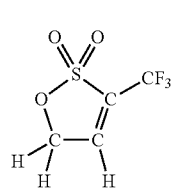
(4-9)
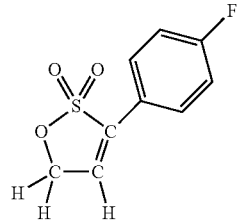

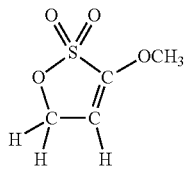

(4-10)

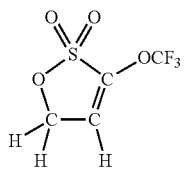

(4-11)

However, the sulfonyl compound may be a compound other than the foregoing compounds, as long as the sulfonyl compound has one of the chemical structures represented by the formulas (1) to (4). Moreover, the sulfonyl compound may be a compound with a structure other than the chemical structures represented by the formulas (1) to (4), as long as the sulfonyl compound has one or more sulfonyl groups.

It is to be noted that the amount of the central section 101 coated with the coating section 102 is not specifically limited; however, for example, the amount may be preferably 0.1 wt % to 5 wt % both inclusive of the central section 101, and more preferably 0.2 wt % to 3 wt % both inclusive of the central section 101, since thereby, a coating function of the coating section 102 is fulfilled without impairing insertion and extraction of an electrode reactant in the central section 101. More specifically, when the amount is smaller than 0.1 wt %, the central section 101 is not sufficiently coated with the coating section 102; therefore, it is difficult to improve chemical stability of the active material 100. On the other hand, when the amount is larger than 5 wt %, it is difficult for the central section 101 to insert and extract the electrode reactant, and energy density is more likely to be decreased.

[Additional Physical Properties of Active Material]

In particular, an intensity ratio of peaks derived from two negative ions and obtained by negative ion analysis on the active material with use of the foregoing TOF-SIMS may preferably satisfy other conditions.

More specifically, attention is focused on a peak derived from a negative ion ($SNO_2^-$) containing sulfur and nitrogen as constituent elements in addition to the foregoing peak derived from the negative ion ($LiF_2^-$). In this case, an intensity ratio IN/IF of two peaks may be preferably 0.03 or more, where the intensity of the peak derived from $SNO_2^-$ represents IN. Details of a procedure of determining the intensity ratio IN/IF, and an apparatus used to determine the intensity ratio IN/IF are similar to those in the case of the above-described intensity ratio IS/IF.

The peak derived from $SNO_2^-$ is mainly a peak derived from a sulfonyl group, a nitrogen bond, and the like present on the surface of the active material and in the vicinity thereof. The larger the intensity IN of this peak is, the more decomposition reaction of an electrolytic solution is suppressed, and the more the generation of gas caused by the decomposition reaction of the electrolytic solution or the like is suppressed. One reason for this is that, even if a decomposition product of the electrolytic solution is produced, the decomposition product is less likely to be gasified. Accordingly, the amount of generated gas is reduced; therefore, even if electrode reaction is repeated, a secondary battery using the active material is resistant to swelling.

One reason why the intensity ratio IN/IF is 0.03 or more is that since balance between intensities IN and IF of the above-described two peaks is made appropriate, both suppression of gas generation and suppression of an increase in electrical resistance of the active material are achieved. Specifically, when the intensity ratio IN/IF is too small (IS/IF<0.03), the amount of a component fulfilling a function of suppressing gas generation (a functional group serving as an $SNO_2^-$ generation source) is insufficient. Therefore, when the intensity ratio IS/IF satisfies the foregoing condition, decomposition reaction of the electrolytic solution is allowed to be suppressed; however, it is difficult to suppress gas generation. On the other hand, when the intensity ratio IN/IF is within an appropriate range (IN/IF≥0.03), the amount of the component fulfilling the function of suppressing gas generation is secured. Therefore, when the intensity ratio IS/IF satisfies the foregoing condition, in addition to suppressing the decomposition reaction of the electrolytic solution, gas is less likely to be generated, and electrical resistance of the active material is less likely to be increased.

The active material in this case may have any structure, as long as the active material is capable of inserting and extracting the electrode reactant, and the intensity ratios IS/IF and IN/IF satisfy the foregoing conditions.

Now, the cross-sectional configuration of the active material 100 illustrated in FIG. 1 is referred again. The coating section 102 in the case where the intensity ratio IN/IF satisfies the foregoing condition may preferably include one or more compounds having a nitrogen bond together with a sulfonyl group (hereinafter referred to as "nitrogen-containing sulfonyl compound"). One reason for this is that, when the sulfonyl group and the nitrogen bond are present on the surface of the central section 101 and in the vicinity thereof, as described above, chemical stability of the active material 100 is improved, and gas generation is suppressed.

The nitrogen-containing sulfonyl compound may be any compound, as long as the nitrogen-containing sulfonyl compound has a sulfonyl group and a nitrogen bond as described above. Specifically, the nitrogen-containing sulfonyl compound may preferably have one or more selected from the group configured of the compounds presented by the formula (1) and the formula (2). Specific examples of the nitrogen-containing sulfonyl compound may include one or more selected from the group configured of the compounds represented by the formulas (1-1) to (1-13) and formulas (2-1) to (2-11).

However, the nitrogen-containing sulfonyl compound may be a compound other than the foregoing compounds, as long as the nitrogen-containing sulfonyl compound has one of the chemical structures represented by the formula (1) and the formula (2). Moreover, the nitrogen-containing sulfonyl compound may be a compound with a structure other than the chemical structures represented by the formula (1) and the formula (2), as long as the nitrogen-containing sulfonyl compound has a nitrogen bond together with a sulfonyl group.

[Other Configuration of Active Material]

The average particle diameter (median diameter) of the active material is not specifically limited, but in particular, the average particle diameter of the active material may be preferably from 2 µm to 50 µm both inclusive, since thereby, a decline in energy density is suppressed, and a possibility of occurrence of a short circuit is reduced.

Specifically, when the average diameter is smaller than 2 lam, a surface area of the active material is too large; therefore, when an active material layer containing the active material is formed, it is necessary to increase additive amounts of an electric conductor, a binder, and the like. Accordingly, the amount of the active material per unit mass is decreased; therefore, energy density is more likely to be decreased. Moreover, in the case where it is necessary to compression-mold the active material layer, the active material layer is more likely to be peeled from a current collector serving as a base, or the like at the time of compression-molding. On the other hand, when the average particle diameter is larger than 50 μm, the active material easily penetrates a separator or the like; therefore, a possibility of occurrence of a short circuit is increased.

[Method of Manufacturing Active Material]

The active material may be manufactured by, for example, the following procedure. It is to be noted that a case where the anode active material 100 including the central section 101 and the coating section 102 illustrated in FIG. 1 is manufactured will be described below.

First, the central section 101 made of an electrode material capable of inserting and extracting an electrode reactant is prepared. The central section 101 may contain a coating element on the surface of the central section 101 such as a lithium-containing compound.

In the case where the coating element is provided on the surface of the central section 101, for example, a compound (a coating-use raw material) containing a coating element as a constituent element may be prepared, and then the coating-use raw material may be pulverized and mixed with the central section 101 to adhere the coating element in the coating-use raw material to the central section 101. Examples of the pulverizing and mixing method may include one or more of a ball mill, a jet mill, a grinder, a pulverizer, and the like. In this case, a liquid such as water may be added to a mixture of the central section 101 and the coating-use raw material.

In addition thereto, in order to provide the coating element on the surface of the central section 101, mechanochemical treatment such as mechanofusion, or a vapor-phase deposition method such as a sputtering method and a chemical vapor deposition (CVD) method may be used. Alternatively, a method of mixing the central section 101 and the coating-use raw material in a solvent such as water or ethanol, a neutralization titration method, or a wet method such as a sol-gel method using a metal alkoxide as a raw material may be used.

The number of times the adhesion process is performed is not specifically limited, and may be once or more. In the case where the adhesion process is performed twice or more, for example, coating elements of different kinds may be used for respective adhesion processes.

It is to be noted that, after the coating element is adhered to the surface of the central section 101, a firing process may be performed in an oxidizing atmosphere (in air, pure oxygen, or the like). The firing temperature is not specifically limited, but may be, for example, from 300° C. to 1000° C. both inclusive. After this firing process, particle size adjustment may be performed by performing a light pulverization process, a sizing operation, or the like.

Next, the coating section 102 is formed on the surface of the central section 101. Examples of a method of forming the coating section 102 may include one or more selected from the group configured of a liquid-phase method and a vapor-phase method. Examples of the liquid-phase method may include a coating method, a soaking method, and a dip coating method, and examples of the vapor-phase method may include an evaporation method, a sputtering method, and a CVD method.

In particular, a liquid-phase method using a solution (a process solution) containing a sulfonyl compound may be preferable, since thereby, the coating section 102 is allowed to be easily formed without heating the central section 101. In the case where the coating section 102 is formed, for example, the surface of the central section 101 may be coated with the process solution, and thereafter, the process solution may be dried, or the central section 101 may be soaked in the process solution, and thereafter, the central section 101 may be taken out of the process solution, and the process solution may be dried. In these cases, the amount of the formed coating section 102 is allowed to be adjusted by changing conditions such as the concentration of the process solution, the coating amount, and soaking time.

Finally, the central section 101 on which the coating section 102 is formed is stored, and the intensity ratio IS/IF is adjusted to satisfy the foregoing condition. In this case, the intensity ratio IS/IF is allowed to be adjusted to a desired value by changing storage conditions (such as a storage temperature and storage time). The intensity ratio IN/IF is allowed to be adjusted according to the storage conditions in a similar manner. Thus, the active material 100 is completed.

[Functions and Effects of Active Material]

According to the active material, the intensity ratio IS/IF determined by negative ion analysis using TOF-SIMS is 0.04 or more. In this case, as described above, balance between the peak intensity IS derived from SO2− contributing to chemical protection of the central section performing insertion and extraction of the electrode reactant and the peak intensity IF derived from $LiF_2^-$ having an influence on electrical resistance is made appropriate. Therefore, suppression of decomposition of the electrolytic solution is suppressed, and the electrical resistance of the active material is less likely to be increased; therefore, battery characteristics of a secondary battery using the active material are allowed to be improved.

In particular, in the case where the active material 100 includes the central section 101 and the coating section 102, when the coating section 102 contains the sulfonyl compound, the intensity ratio IS/IF is allowed to be set easily and stably to satisfy the foregoing condition. In this case, the sulfonyl compound has one of the chemical structures represented by the formulas (1) to (4). More specifically, a higher effect is obtainable by the compound represented by one of the formula (1-1), the formula (2-1), the formula (3-1), and the formula (4-1).

Moreover, when the intensity ratio IN/IF determined by negative ion analysis using TOF-SIMS is 0.03 or more, gas generation is suppressed; therefore, battery characteristics of the secondary battery using the active material are allowed to be further improved.

In particular, in the case where the active material 100 includes the central section 101 and the coating section 102, when the coating section contains the nitrogen-containing sulfonyl compound, the intensity ratio IN/IF is allowed to be set easily and stably to satisfy the above-described condition. In this case, the nitrogen-containing sulfonyl compound has one of the chemical structures represented by the formula (1) and the formula (2). More specifically, a higher effect is obtainable by the compound represented by one of the formula (1-1), the formula (2-1), and the like.

(2. Application Examples of Secondary Battery-Use Active Material)

Next, application examples of the foregoing secondary battery-use active material will be described below. This secondary battery-use active material may be used for a secondary battery-use electrode and a secondary battery in the following manner.

(2-1. Secondary Battery-Use Electrode and Secondary Battery (Cylindrical-Type Lithium-Ion Secondary Battery))

FIG. 2 and FIG. 3 illustrate cross-sectional configurations of a secondary battery. FIG. 3 illustrates enlarged part of a spirally wound electrode body 20 illustrated in FIG. 2. In this example, the secondary battery-use electrode is applied to a cathode 21, for example.

[Whole Configuration of Secondary Battery]

The secondary battery described here is a lithium secondary battery (lithium ion secondary battery) in which a capacity of an anode 22 is obtained by insertion and extraction of lithium (lithium ions) as an electrode reactant, and is a so-called cylindrical-type secondary battery.

For example, as illustrated in FIG. 2, the secondary battery may contain a pair of insulating plates 12 and 13 and the spirally wound electrode body 20 inside a battery can 11 in the shape of a substantially-hollow cylinder. In the spirally wound electrode body 20, for example, the cathode 21 and the anode 22 are layered with a separator 23 in between and are spirally wound.

For example, the battery can 11 may have a hollow structure in which one end of the battery can 11 is closed and the other end of the battery can 11 is opened. The battery can 11 may be made of, for example, one or more of iron, aluminum, an alloy thereof, and the like. The surface of the battery can 11 may be plated with nickel or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient element (PTC element) 16 are attached by being caulked with a gasket 17. Therefore, the battery can 11 is hermetically sealed. The battery cover 14 may be made of, for example, a material similar to that of the battery can 11. The safety valve mechanism 15 and the PTC element 16 are provided inside the battery cover 14. The safety valve mechanism 15 is electrically connected to the battery cover 14 through the PTC element 16. In the safety valve mechanism 15, in the case where the internal pressure becomes a certain level or more by internal short circuit, external heating, or the like, a disk plate 15A inverts to disconnect electric connection between the battery cover 14 and the spirally wound electrode body 20. The PTC element 16 prevents abnormal heat generation resulting from a large current. As temperature rises, resistance of the PTC element 16 is increased accordingly. The gasket 17 may be made of, for example, an insulating material. The surface of the gasket 17 may be coated with asphalt.

In the center of the spirally wound electrode body 20, for example, a center pin 24 may be inserted. For example, a cathode lead 25 made of a conductive material such as aluminum may be connected to the cathode 21. For example, an anode lead 26 made of a conductive material such as nickel may be connected to the anode 22. For example, the cathode lead 25 may be attached to the safety valve mechanism 15 by welding, and may be electrically connected to the battery cover 14. For example, the anode lead 26 may be attached to the battery can 11 by welding, and may be electrically connected to the battery can 11.

[Cathode]

The cathode 21 as the secondary-use electrode has a cathode active material layer 21B on a single surface or both surfaces of a cathode current collector 21A. The cathode current collector 21A may be made of, for example, one or more of conductive materials such as aluminum, nickel, and stainless steel. The cathode active material layer 21B contains, as cathode active materials, one or more of cathode materials capable of inserting and extracting lithium. The cathode material contains the foregoing secondary battery-use active material. However, the cathode active material layer 21B may further contain other materials such as a cathode binder and a cathode electric conductor.

The cathode binder may contain one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

The cathode electric conductor may contain one or more of carbon materials and the like. Examples of the carbon materials may include graphite, carbon black, acetylene black, and Ketjen black. It is to be noted that the cathode electric conductor may be a metal material, a conductive polymer, or the like as long as the material has electric conductivity.

It is to be noted that the cathode active material layer 21B may further contain other cathode material as long as the cathode active material layer 21B contains the foregoing secondary battery-use active material as a cathode material. Examples of such other cathode material may include one or more of a lithium composite oxide, a lithium phosphate compound, and the like (excluding a compound corresponding to the secondary battery-use active material).

Examples of the lithium composite oxide may include $LiCoO_2$, $LiNiO_2$, and a lithium-nickel-based composite oxide represented by the following Formula (20). Examples of the lithium phosphate compound may include $LiFePO_4$ and $LiFe_{1-u}Mn_u PO_4$ (u<1), since thereby, a high battery capacity is obtained, and superior cycle characteristics are obtained.

$$LiNi_{1-z}M_zO_2 \qquad (20)$$

where M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb, and z satisfies 0.005<z<0.5.

In addition thereto, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material is not limited to any of the foregoing materials, and may be other material.

[Anode]

The anode 22 has an anode active material layer 22B on a single surface or both surfaces of an anode current collector 22A.

The anode current collector 22A may be made of, for example, one or more of electrically-conductive materials such as copper, nickel, and stainless steel. The surface of the anode current collector 22A may be preferably roughened. Thereby, due to a so-called anchor effect, adhesibility of the anode active material layer 22B with respect to the anode current collector 22A is improved. In this case, it is enough that the surface of the anode current collector 22A in a region opposed to the anode active material layer 22B is roughened at minimum. Examples of roughening methods may include a method of forming fine particles by utilizing electrolytic treatment. The electrolytic treatment is a method of forming the fine particles on the surface of the anode current collector 22A with the use of an electrolytic method in an electrolytic bath to provide concavity and convexity on the surface of the anode current collector 22A. A copper foil fabricated by an electrolytic method is generally called "electrolytic copper foil."

The anode active material layer 22B contains one or more of anode materials capable of inserting and extracting lithium as anode active materials. The anode active material layer 22B may further contain other materials such as an anode binder and an anode electric conductor. Details of the anode binder and the anode electric conductor may be, for example, similar to those of the cathode binder and the cathode electric conductor. However, the charging capacity of the anode material may be preferably larger than the discharging capacity of the cathode 21 in order to prevent lithium metal from being unintentionally precipitated on the anode 22 in the middle of charge. In other words, the electrochemical equivalent of the anode material capable of inserting and extracting lithium may be preferably larger than the electrochemical equivalent of the cathode 21.

Examples of the anode material may include one or more of carbon materials. In the carbon material, its crystal structure change at the time of insertion and extraction of Li is extremely small, and therefore, the carbon material provides high energy density and superior cycle characteristics. Further, the carbon material functions as an anode electric conductor as well. Examples of the carbon material may include graphitizable carbon, non-graphitizable carbon, and graphite. However, the spacing of (002) plane in the non-graphitizable carbon may be preferably equal to or greater than 0.37 μm, and the spacing of (002) plane in graphite may be preferably equal to or smaller than 0.34 μm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000° C. or less. It is to be noted that the shape of the carbon material may be any of a fibrous shape, a spherical shape, a granular shape, and a scale-like shape.

Further, the anode material may be, for example, a material (metal-based material) containing one or more of metal elements and metalloid elements as constituent elements, since higher energy density is thereby obtained. Such a metal-based material may be a simple substance, an alloy, or a compound, may be two or more thereof, or may have one or more phases thereof in part or all thereof. It is to be noted that "alloy" includes a material containing one or more metal elements and one or more metalloid elements, in addition to a material configured of two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming an alloy with lithium. Specific examples thereof may include Mg, B, Al, Ga, In, Si, Ge, Sn, Pb, Bi, Cd, Ag, Zn, Hf, Zr, Y, Pd, and Pt. In particular, Si or Sn or both may be preferable. One reason for this is that Si and Sn have a superior ability of inserting and extracting lithium, and therefore, provide high energy density.

A material containing Si or Sn or both as constituent elements may be any of a simple substance, an alloy, and a compound of Si, may be any of a simple substance, an alloy, and a compound of Sn, may be two or more thereof, or may have one or more phases thereof in part or all thereof. It is to be noted that the simple substance merely refers to a general simple substance (a small amount of impurity may be therein contained), and does not necessarily refer to a purity 100% simple substance.

The alloys of Si may contain, for example, one or more of elements such as Sn, Ni, Cu, Fe, Co, Mn, Zn, In, Ag, Ti, Ge, Bi, Sb, and Cr as constituent elements other than Si. The compounds of Si may contain, for example, one or more of C, O, and the like as constituent elements other than Si. It is to be noted that, for example, the compounds of Si may contain one or more of the elements described for the alloys of Si as constituent elements other than Si.

Examples of the alloys of Si and the compounds of Si may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 \leq v \leq 2$), and LiSiO, where v in $SiO_v$ may be in the range of $0.2<v<1.4$.

The alloys of Sn may contain, for example, one or more of elements such as Si, Ni, Cu, Fe, Co, Mn, Zn, In, Ag, Ti, Ge, Bi, Sb, and Cr as constituent elements other than Sn. The compounds of Sn may contain, for example, one or more of elements such as C and O as constituent elements other than Sn. It is to be noted that the compounds of Sn may contain, for example, one or more of the elements described for the alloys of Sn as constituent elements other than Sn. Examples of the alloys of Sn and the compounds of Sn may include $SnO_w$ ($0<w \leq 2$), $SnSiO_3$, LiSnO, and $Mg_2Sn$.

Further, as a material containing Sn as a constituent element, for example, a material containing a second constituent element and a third constituent element in addition to Sn as a first constituent element may be preferable. Examples of the second constituent element may include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include one or more of elements such as B, C, Al, and P. In the case where the second constituent element and the third constituent element are contained, a high battery capacity, superior cycle characteristics, and the like are obtained.

In particular, a material (SnCoC-containing material) containing Sn, Co, and C as constituent elements may be preferable. The composition of the SnCoC-containing material may be, for example, as follows. That is, the C content may be from 9.9 mass % to 29.7 mass % both inclusive, and the ratio of Sn and Co contents (Co/(Sn+Co)) may be from 20 mass % to 70 mass % both inclusive, since high energy density is obtained in such a composition range.

It may be preferable that the SnCoC-containing material have a phase containing Sn, Co, and C. Such a phase may be preferably low-crystalline or amorphous. The phase is a phase (reaction phase) capable of reacting with lithium. Due to existence of the reaction phase, superior characteristics are obtained. The half bandwidth of the diffraction peak obtained by X-ray diffraction of the phase may be preferably equal to or greater than 1° based on diffraction angle of 2θ in the case where CuKα ray is used as a specific X ray, and the insertion rate is 1°/min Thereby, lithium is more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in the range of $2\theta=$from $20°$ to $50°$ both inclusive. Such a reaction phase may have, for example, the foregoing respective constituent elements, and the low crystalline or amorphous structure thereof possibly results from existence of C mainly.

In the SnCoC-containing material, part or all of C as a constituent element may be preferably bound to a metal element or a metalloid element as other constituent element, since cohesion or crystallization of Sn and/or the like is suppressed accordingly. The binding state of elements is allowed to be checked by, for example, an X-ray photoelectron spectroscopy method (XPS). In a commercially available device, for example, as a soft X ray, Al—K$\alpha$ ray, Mg—K$\alpha$ ray, or the like may be used. In the case where part or all of C are bound to a metal element, a metalloid element, or the like, the peak of a synthetic wave of is orbit of C (C1s) is shown in a region lower than 284.5 eV. It is to be noted that in the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest binding energy side is the energy standard (284.8 eV).

It is to be noted that the SnCoC-containing material is not limited to the material (SnCoC) formed of only Sn, Co, and C as constituent elements. In other words, the SnCoC-containing material may further contain, for example, one or more of Si, Fe, Ni, Cr, In, Nb, Ge, Ti, Mo, Al, P, Ga, Bi, and the like as constituent elements, in addition to Sn, Co, and C.

In addition to the SnCoC-containing material, a material containing Sn, Co, Fe, and C as constituent elements (SnCoFeC-containing material) may be also preferable. The composition of the SnCoFeC-containing material may be any composition. For example, the composition in which the Fe content is set small may be as follows. That is, the C content may be from 9.9 mass % to 29.7 mass % both inclusive, the Fe content may be from 0.3 mass % to 5.9 mass % both inclusive, and the ratio of contents of Sn and Co (Co/(Sn+Co)) may be from 30 mass % to 70 mass % both inclusive. Further, the composition in which the Fe content is set large is as follows. That is, the C content is from 11.9 mass % to 29.7 mass % both inclusive, the ratio of contents of Sn, Co, and Fe ((Co+Fe)/(Sn+Co+Fe)) is from 26.4 mass % to 48.5 mass % both inclusive, and the ratio of contents of Co and Fe (Co/(Co+Fe)) is from 9.9 mass % to 79.5 mass % both inclusive. In such a composition range, high energy density is obtained. The physical properties (such as half bandwidth) of the SnCoFeC-containing material are similar to those of the foregoing SnCoC-containing material.

In addition thereto, the anode material may be, for example, one or more of a metal oxide, a polymer compound, and the like. Examples of the metal oxide may include iron oxide, ruthenium oxide, and molybdenum oxide. Examples of the polymer compound may include polyacetylene, polyaniline, and polypyrrole. However, the anode material is not limited to the foregoing material, and may be other material.

The anode active material layer 22B may be formed by, for example, one or more of a coating method, a vapor-phase method, a liquid-phase method, a spraying method, and a firing method (sintering method). The coating method may be a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method may include an electrolytic plating method and an electroless plating method. The spraying method is a method in which an anode active material in a fused state or a semi-fused state is sprayed to the anode current collector 22A. The firing method may be, for example, a method in which after the anode current collector 22A is coated by a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium may be preferably larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.2 V even if the same cathode active material is used. Therefore, amounts of the cathode active material and the anode active material are adjusted accordingly. Thereby, high energy density is obtainable.

[Separator]

The separator 23 separates the cathode 21 from the anode 22, and passes lithium ions while preventing current short circuit resulting from contact of both electrodes. The separator 23 may be, for example, a porous film made of a synthetic resin, ceramics, or the like. The separator 23 may be a laminated film in which two or more kinds of porous films are laminated. Examples of the synthetic resin may include polytetrafluoroethylene, polypropylene, and polyethylene.

In particular, the separator 23 may include, for example, a polymer compound layer provided on one surface or both surfaces of the foregoing porous film (base material layer). One reason for this is that, thereby, adhesibility of the separator 23 with respect to the cathode 21 and the anode 22 is improved, and therefore, distortion of the spirally wound electrode body 20 is suppressed. Therefore, decomposition reaction of the electrolytic solution is suppressed, and liquid leakage of the electrolytic solution with which the base material layer is impregnated is suppressed. Accordingly, even if charge and discharge are repeated, the resistance is less likely to be increased, and battery swelling is suppressed.

The polymer compound layer may contain, for example, a polymer material such as polyvinylidene fluoride, since such a polymer material has superior physical strength and is electrochemically stable. However, the polymer material may be a polymer material other than polyvinylidene fluoride. The polymer compound layer may be formed as follows, for example. That is, after a solution in which the polymer material is dissolved is prepared, the base material layer is coated with the solution, and the resultant is subsequently dried. Alternatively, the base material layer may be soaked in the solution and may be subsequently dried.

[Electrolyte Solution]

The separator 23 is impregnated with an electrolytic solution as a liquid electrolyte. The electrolytic solution contains a solvent and an electrolyte salt, and may further contain other material such as an additive.

The solvent contains one or more of nonaqueous solvents such as an organic solvent. Examples of the nonaqueous solvents may include a cyclic ester carbonate, a chain ester carbonate, lactone, a chain carboxylic ester, and nitrile, since a superior battery capacity, superior cycle characteristics, superior conservation characteristics, and the like are thereby obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, or dimethyl sulfoxide, since thereby, a similar advantage is obtained.

In particular, one or more of ethylene carbonate, propylene carbonate, dimethyl carbonate, diethyl carbonate, and ethyl methyl carbonate may be preferable, since a further superior battery capacity, further superior cycle characteristics, further superior conservation characteristics, and the like are thereby obtained. In this case, a combination of a high viscosity (high dielectric constant) solvent (for example, specific dielectric constant $\varepsilon \geq 30$) such as ethylene carbonate and propylene carbonate and a low viscosity solvent (for example, viscosity≤1 mPa·s) such as dimethyl carbonate, ethylmethyl carbonate, and diethyl carbonate may be more preferable. One reason for this is that the dissociation property of the electrolyte salt and ion mobility are thereby improved.

In particular, the solvent may preferably contain one or more of an unsaturated cyclic ester carbonate, a halogenated ester carbonate, sultone (cyclic sulfonic ester), an acid anhydride, and the like. One reason for this is that, in this case, chemical stability of the electrolytic solution is improved. The unsaturated cyclic ester carbonate is a cyclic ester carbonate including one or more unsaturated carbon bonds (carbon-carbon double bonds). Examples of the unsaturated cyclic ester carbonate may include vinylene carbonate, vinylethylene carbonate, and methyleneethylene carbonate. The halogenated ester carbonate is a cyclic ester carbonate having one or more halogens as constituent elements or a chain ester carbonate having one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis(fluoromethyl) carbonate, and difluoromethyl methyl carbonate. Examples of the sultone may include propane sultone and propene sultone. Examples of the acid anhydrides may include a succinic anhydride, an ethane disulfonic anhydride, and a sulfobenzoic anhydride. However, the solvent is not limited to the foregoing materials, and may be other material.

The electrolyte salt may contain, for example, one or more of salts such as a lithium salt. However, the electrolyte salt may contain a salt other than the lithium salt. Examples of the salt other than the lithium salt may include a light metal salt other than the lithium salt.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained.

In particular, one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained. However, the electrolyte salt is not limited to the foregoing materials, and may be other material.

Although the content of the electrolyte salt is not particularly limited, the content thereof may be preferably from 0.3 mol/kg to 3.0 mol/kg both inclusive with respect to the solvent, since high ion conductivity is obtained thereby.

[Operation of Secondary Battery]

The secondary battery may operate, for example, as follows. At the time of charge, lithium ions extracted from the cathode 21 are inserted in the anode 22 through the electrolytic solution. In contrast, at the time of discharge, lithium ions extracted from the anode 22 are inserted in the cathode 21 through the electrolytic solution.

In particular, at the time of charge, a charging voltage (a cathode electric potential: a standard electric potential to lithium metal) may be preferably set to a high voltage. More specifically, an upper limit of the charging voltage may be preferably set to 4.2 or more, and may be more preferably set to 4.4 V or more, since thereby, a sufficient amount of lithium are extracted from the cathode active material at the time of the charge. However, in order to suppress decomposition reaction of the cathode active material, it may be preferable that the charging voltage not be excessively high. Specifically, the charging voltage may be preferably 4.8 V or less, and may be more preferably 4.6 V or less.

More specifically, when the secondary battery is charged to a high voltage of 4.2 V or more, a high electromotive force is generated; therefore, the electrolytic solution that may come into contact with the cathode active material is exposed to a strong oxidizing environment. In this case, since the cathode active material from which a large amount of lithium is extracted becomes unstable, the cathode active material is easily deteriorated due to elution of a metal component, and the electrolytic solution is easily oxidatively decomposed. Moreover, when the metal component eluted from the cathode active material is deposited on the anode by reduction, insertion and extraction of lithium is impaired; therefore, battery characteristics such as cycle characteristics are easily deteriorated. Further, when the electrolytic solution is oxidatively decomposed on the cathode 21, gas is generated, and a coating film caused by a decomposition product of the electrolyte solution is formed; therefore, the secondary battery is easily swollen, and impedance is easily increased.

On this point, when the cathode active material contains the foregoing secondary battery-use active material, the cathode active material is stable with respect to a high electromotive force of the cathode; therefore, reaction between the cathode 21 and the electrolytic solution is suppressed. Therefore, decomposition reaction of the electrolytic solution is suppressed, and the coating film such as LIF with low lithium-ion permeability is less likely to be formed. Thus, when the secondary battery is charged to a high voltage of 4.2 V or more, an increase in capacity with an increase in charging voltage is achieved, and battery characteristics such as cycle characteristics are secured.

On the other hand, at the time of discharge, a discharging voltage (a cathode electric potential: a standard electric potential to lithium metal) may be preferably set to a low voltage. Specifically, a lower limit of the discharging voltage may be preferably set to 3.3 V or less, since a sufficient amount of lithium is inserted in the cathode active material at the time of the discharge. However, it may be preferable that the discharging voltage not be excessively low. More specifically, the discharging voltage may be preferably 2.0 V or more.

[Method of Manufacturing Secondary Battery]

The secondary battery may be manufactured, for example, by the following procedure.

First, the cathode 21 is fabricated. In this case, the cathode active material (containing the foregoing secondary battery-use active material) is mixed with a cathode binder, a cathode electric conductor, and/or the like to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded with the use of a roll pressing machine and/or the like. In this case, compression-molding may be performed while heating, or compression-molding may be repeated several times.

Further, the anode 22 is fabricated by a procedure similar to that of the cathode 21 described above. In this case, the anode active material is mixed with an anode binder, an anode electric conductor, and/or the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B is compression-molded.

Finally, the secondary battery is assembled using the cathode 21 and the anode 22. The cathode lead 25 is attached to the cathode current collector 21A by a welding method and/or the like, and the anode lead 26 is attached to the anode current collector 22A by a welding method and/or the like. Subsequently, the cathode 21 and the anode 22 are layered with the separator 23 in between and are spirally wound, and the spirally wound electrode body 20 is thereby fabricated. Thereafter, the center pin 24 is inserted in the center of the spirally wound electrode body 20. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution in which the electrolyte salt is dispersed in the solvent is injected into the battery can 11, and the separator 23 is impregnated with the electrolytic solution. Subsequently, at the open end of the battery can 11, the battery cover 14, the safety valve mechanism 15, and the PTC element 16 are fixed by being caulked with the gasket 17.

[Function and Effect of Secondary Battery]

According to the cylindrical-type secondary battery, the cathode active material layer 21B of the cathode 21 contains the foregoing secondary battery-use active material as a cathode active material. Therefore, as described above, decomposition of the electrolytic solution is suppressed, and electrical resistance of the cathode 21 is reduced, and superior battery characteristics are obtainable accordingly. Other functions and other effects are similar to those of the secondary battery-use active material.

(2-2. Secondary Battery-Use Electrode and Secondary Battery (Laminated-Film-Type Lithium Ion Secondary Battery))

FIG. 4 illustrates an exploded perspective configuration of another secondary battery. FIG. 5 illustrates an enlarged cross-section taken along a line V-V of a spirally wound electrode body 30 illustrated in FIG. 4. However, FIG. 4 illustrates a state that the spirally wound electrode body 30 is separated from two outer package members 40. In the following description, the elements of the cylindrical-type secondary battery described above will be used as necessary.

[Whole Configuration of Secondary Battery]

The secondary battery described here is a so-called laminated-film-type lithium ion secondary battery. For example, as illustrated in FIG. 4, the spirally wound electrode body 30 may be contained in a film-like outer package member 40. In the spirally wound electrode body 30, for example, a cathode 33 and an anode 34 may be layered with a separator 35 and an electrolyte layer 36 in between and may be spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made of, for example, an electrically-conductive material such as aluminum, and the anode lead 32 may be made of, for example, an electrically-conducive material such as copper, nickel, and stainless steel. These electrically-conductive materials may be in the shape of, for example, a thin plate or mesh.

The outer package member 40 may be a laminated film in which, for example, a fusion bonding layer, a metal layer, and a surface protective layer are laminated in this order. The outer package member 40 may be obtained by, for example, layering two laminated films so that the fusion bonding layers are opposed to the spirally wound electrode body 30, and subsequently fusion bonding outer edges of the respective fusion bonding layers. However, the two laminated films may be bonded to each other by an adhesive or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, the outer package member 40 may preferably be an aluminum laminated film in which a polyethylene film, an aluminum foil, and a nylon film are laminated in this order. However, the outer package member 40 may be a laminated film having other laminated structure, a polymer film such as polypropylene, or a metal film.

For example, an adhesive film 41 to prevent outside air intrusion may be inserted between the outer package member 40 and the cathode lead 31 and between the outer package member 40 and the anode lead 32. The adhesive film 41 is made of a material having adhesion characteristics with respect to the cathode lead 31 and the anode lead 32. Examples of the material having adhesion characteristics may include a polyolefin resin. More specific examples thereof may include polyethylene, polypropylene, modified polyethylene, and modified polypropylene.

The cathode 33 may have, for example, a cathode active material layer 33B on both surfaces of a cathode current collector 33A. The anode 34 may have, for example, an anode active material layer 34B on both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. In other words, the cathode active material layer 33B of the cathode 33 as a secondary battery-use electrode contains the foregoing secondary battery-use active material as a cathode active material. The configuration of the separator 35 is similar to the configuration of the separator 23.

[Electrolyte Layer]

In the electrolyte layer 36, an electrolytic solution is held by a polymer compound. The electrolyte layer 36 is a so-called gel electrolyte, since thereby, high ion conductivity (for example, 1 mS/cm or more at room temperature) is obtained and liquid leakage of the electrolytic solution is prevented. The electrolyte layer 36 may further contain other material such as an additive.

The polymer compound contains one or more of polymer materials. Examples of the polymer materials may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropropylene. In particular, polyvinylidene fluoride or the copolymer of vinylidene fluoride and hexafluoropropylene may be preferable, and polyvinylidene fluoride may be more preferable, since such a polymer compound is electrochemically stable.

For example, the composition of the electrolytic solution may be similar to the composition of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate, for example, as follows. At the time of charge, lithium ions extracted from the cathode 33 may be inserted in the anode 34 through the electrolyte layer 36. In contrast, at the time of discharge, lithium ions extracted from the anode 34 may be inserted in the cathode 33 through the electrolyte layer 36. Charge-discharge conditions (the upper limit of the charging voltage and the lower limit of the discharging voltage) in this case are similar to those in the cylindrical-type secondary battery.

[Method of Manufacturing Secondary Battery]

The secondary battery including the gel electrolyte layer 36 may be manufactured, for example, by one of the following three procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, a precursor solution containing an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by a welding method and/or the like, and the anode lead 32 is attached to the anode current collector 34A by a welding method and/or the like. Subsequently, the cathode 33 and the anode 34 are layered with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outer edges other than one side of the outer package members 40 are bonded by a thermal fusion bonding method and/or the like, and the spirally wound body is contained in the pouch-like outer package member 40. Subsequently, an electrolytic solution, a monomer as a raw material for the polymer compound, a polymerization initiator, and other materials such as a polymerization inhibitor are mixed to prepare a composition for electrolyte. Subsequently, the composition for electrolyte is injected into the pouch-like outer package member 40. Thereafter, the outer package member 40 is hermetically sealed by a thermal fusion bonding method and/or the like. Subsequently, the monomer is thermally polymerized, and thereby, a polymer compound is formed. As a result, the polymer compound is impregnated with the electrolytic solution, the polymer compound is gelated, and accordingly, the electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples of the homopolymer may include polyvinylidene fluoride. Examples of the copolymer may include a binary copolymer containing vinylidene fluoride and hexafluoro propylene as components. Examples of the multicomponent copolymer may include a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed by a thermal fusion bonding method and/or the like. Subsequently, the resultant is heated while a weight is applied to the outer package member 40, and the separator 35 is adhered to the cathode 33 and the anode 34 with the polymer compound in between. As a result, the polymer compound is impregnated with the electrolytic solution, the polymer compound is gelated, and accordingly, the electrolyte layer 36 is formed.

In the third procedure, swelling of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated-film-type secondary battery, since the cathode active material layer 33B of the cathode 33 contains the foregoing secondary battery-use active material as a cathode active material. Therefore, superior battery characteristics are achievable for a reason similar to that of the cylindrical-type secondary battery. Other functions and other effects are similar to those of the cylindrical-type secondary battery.

(2-3. Secondary Battery-Use Electrode and Secondary Battery (Lithium-Metal Secondary Battery))

A secondary battery described here is a lithium secondary battery (lithium metal secondary battery) in which the capacity of the anode 22 is obtained by precipitation and dissolution of lithium metal. The secondary battery has a configuration similar to that of the foregoing cylindrical-type lithium ion secondary battery, except that the anode active material layer 22B is formed of the lithium metal, and is manufactured by a procedure similar to that of the cylindrical-type lithium ion secondary battery.

In the secondary battery, the lithium metal is used as an anode active material, and thereby, high energy density is obtainable. The anode active material layer 22B may exist at the time of assembling, or the anode active material layer 22B does not necessarily exist at the time of assembling and may be formed of the lithium metal precipitated at the time of charge. Further, the anode active material layer 22B may be used as a current collector, and thereby, the anode current collector 22A may be omitted.

The secondary battery may operate, for example, as follows. At the time of charge, lithium ions are discharged from the cathode 21, and are precipitated as the lithium metal on the surface of the anode current collector 22A through the electrolytic solution. In contrast, at the time of discharge, the lithium metal is eluded as lithium ions from the anode active material layer 22B, and is inserted in the cathode 21 through the electrolytic solution. Charge-discharge conditions (the upper limit of the charging voltage and the lower limit of the discharging voltage) in this case are similar to those in the cylindrical-type lithium ion secondary battery.

According to the lithium metal secondary battery, since the cathode active material layer 21B of the cathode 21 contains the foregoing secondary battery-use active material as a cathode active material, superior battery characteristics are obtainable for a reason similar to that of the lithium ion secondary battery. Other functions and other effects are similar to those of the lithium ion secondary battery. It is to be noted that the secondary battery described here is not limited to the cylindrical-type secondary battery, and may be a laminated-film-type secondary battery.

(3. Applications of Secondary Battery)

Next, a description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary batter is utilized as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used as a removable and replaceable electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present technology. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and therefore, home electric products and the like become usable with the use of the electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

A description will be specifically given of some application examples of the secondary battery. It is to be noted that the configurations of the respective application examples explained below are merely examples, and may be changed as appropriate.

(3-1. Battery Pack)

FIG. 6 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection element 69, a current detection resistance 70, a cathode terminal 71, and an anode terminal 72 in a housing 60 made of a plastic material and/or the like.

The control section 61 controls operation of the whole battery pack (including a usage state of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of the secondary batteries may be a series-connected type, may be a parallel-connected type, or may be a mixed type thereof. As an example, the electric power source 62 may include six secondary batteries connected in a manner of dual-parallel and three-series.

The switch section 63 switches the usage state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection element 69, and outputs the measurement result to the control section 61. The temperature measurement result may be used for, for example, a case in which the control section 61 controls charge and discharge at the time of abnormal heat generation or a case in which the control section 61 performs correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a non-volatile memory or the like. The memory 68 may hold, for example, numerical values calculated by the control section 61 and information of the secondary battery measured in a manufacturing step (such as an internal resistance in the initial state). It is to be noted that, in the case where a full charging capacity of the secondary battery is stored in the memory 68, the control section 61 is allowed to comprehend information such as a remaining capacity.

The temperature detection element 69 measures temperature of the electric power source 62, and outputs the measurement result to the control section 61. The temperature detection element 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

(3-2. Electric Vehicle)

FIG. 7 illustrates a block configuration of a hybrid automobile as an example of electric vehicles. For example, the electric vehicle may include a control section 74, an engine 75, an electric power source 76, a driving motor 77, a differential 78, an electric power generator 79, a transmission 80, a clutch 81, inverters 82 and 83, and various sensors 84 in a housing 73 made of metal. In addition thereto, the electric vehicle may include, for example, a front drive shaft 85 and front tires 86 that are connected to the differential 78 and the transmission 80, a rear drive shaft 87, and rear tires 88.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tires 86 or the rear tires 88 through the differential 78, the transmission 80, and the clutch 81 as drive sections, for example. The torque of the engine 75 may also be transferred to the electric power generator 79. With the use of the torque, the electric power generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tires 86 or the rear tires 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (electric automobile) working with the use of only the electric power source 76 and the motor 77 without using the engine 75.

(3-3. Electric Power Storage System)

FIG. 8 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 disposed inside the house 89, and may be connectable to an electric vehicle 96 parked outside the house 89. Further, for example, the electric power source 91 may be connected to a private power generator 95 disposed inside the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a usage state of the electric power source 91), and, for example, may include a CPU and/or the like. The electric power source 91 includes one or more secondary batteries (not illustrated). The smart meter 92 may be, for example, an electric power meter compatible with a network disposed in the house 89 of an electric power demander, and may be communicable with an electric power supplier. Accordingly, for example, while the smart meter 92 communicates with outside, the smart meter 92 controls the balance between supply and demand in the house 89, and thereby, allows effective and stable energy supply.

In the electric power storage system, for example, electric power may be stored in the electric power source 91 from the concentrating electric power system 97 as an external electric power source through the smart meter 92 and the power hub 93, and electric power is stored in the electric power source 91 from the solar power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. In other words, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be provided for each household (family unit), or may be provided for a plurality of households (family units).

(3-4. Electric Power Tool)

FIG. 9 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a usage state of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Specific examples according to the present technology will be described in detail.

Experimental Examples 1 to 30

The laminated-film-type secondary battery illustrated in FIG. 4 and FIG. 5 was fabricated with use of the active material 100 illustrated in FIG. 1 as a cathode active material by the following procedure.

First, the cathode 33 was fabricated as follows. In this case, lithium composite oxide powder having an average composition represented by $LiCo_{0.98}Al_{0.01}Mg_{0.01}O_2$ (Li-CAMO) was prepared as the central section 101. The average particle diameter of the central section 101 measured by a laser scattering method was about 13 μm.

Subsequently, a process solution containing one of formation materials (sulfonyl compounds) illustrated in Tables 1 and 2 of the coating section 102 was prepared. A solvent of the process solution was 4-chlorophenol, and the concentration thereof was 1 wt %. Subsequently, after the central section 101 was soaked in the process solution for several seconds, the process solution was stirred. Subsequently, the central section 101 was taken out of the process solution, and was dried in a reduced-pressure environment at 60° C. Thus, the coating section 102 containing the sulfonyl compound was formed on the surface of the central section 101, thereby obtaining the cathode active material.

It is to be noted that in order to obtain the cathode active material, for comparison, the central section 101 was used as it is without forming the coating section 102 thereon. Moreover, instead of forming the coating section 102, the sulfonyl compound was contained in the electrolytic solution. In this case, the content of the sulfonyl compound in the electrolytic solution was equivalent to 10 wt % of the weight of electrolyte salt.

Subsequently, 98 parts by mass of the cathode active material, 1.2 parts by mass of a cathode binder (polyvinylidene fluoride), and 0.8 parts by mass of a cathode electric conductor (Ketjen black as amorphous carbon powder) were mixed to obtain a cathode mixture. Subsequently, the cathode mixture was dispersed in an organic solvent (N-methyl-2-pyrrolidone) to obtain cathode mixture slurry. Subsequently, both surfaces of the cathode current collector 33A (a strip-shaped aluminum foil having a thickness of 20 μm) were coated with the cathode mixture slurry uniformly, which was dried by hot air to form the cathode active material layer 33B. Finally, the cathode active material layer 33B was compression-molded with the use of a roll pressing machine.

Subsequently, the anode 34 was fabricated as follows. In this case, an anode active material (carbon) was deposited on both surfaces of the strip-shaped anode current collector 34A (a copper foil having a thickness of 10 μm) by an electron beam evaporation method to form the anode active material layer 34B. In this case, the thickness of the anode active material layer 34B on one surface of the anode current collector 34A was 5 μm. It is to be noted that in order to prevent lithium metal from being precipitated on the anode 34 at the middle of charge, the charging capacity by the anode active material was larger than the charging capacity of the cathode 21.

Subsequently, electrolyte salt ($LiPF_6$) was dissolved in a solvent (ethylene carbonate and diethyl carbonate) to prepare an electrolytic solution. In this case, the composition (weight ratio) of the solvent was ethylene carbonate:diethyl carbonate=30:70, and the concentration of the electrolyte salt in the electrolyte solution was 1 mol/kg.

Subsequently, the secondary battery was assembled as follows. The cathode lead 31 made of aluminum was welded to the cathode current collector 33A of the cathode 33, and the anode lead 26 made of nickel was welded to the anode current collector 34A of the anode 34. Subsequently, the cathode 33 and the anode 34 were laminated with the separator 35 (a microporous polyethylene film having a thickness of 25 μm) in between, and the resultant laminated body was spirally wound in a longitudinal direction to fabricate the spirally wound electrode body 30. Thereafter, the protective tape 37 was adhered to the outermost peripheral section of the spirally wound electrode body 30. Subsequently, the spirally wound electrode body 30 was placed between two film-like outer package members 40. Thereafter, outer edges on three sides of the outer package members 40 were thermally fusion-bonded to obtain a pouch-like shape. The outer package member 40 was a moisture-resistant aluminum laminated film in which a nylon film (having a thickness of 30 μm), an aluminum foil (having a thickness of 40 μm), and a polypropylene film (having a thickness of 30 μm) were laminated from outside. Finally, the electrolytic solution was injected into the outer package members 40, and the separator 35 was impregnated with the electrolytic solution. Thereafter, outer edges on the remaining one side of the outer package members 40 were thermally fusion-bonded to each other in a reduced-pressure environment. Thus, the secondary battery was completed.

Finally, the secondary battery was charged. Thereafter, the secondary battery in a charged state was stored under storage conditions illustrated in Tables 1 and 2. At the time of charge, charge was performed at current density of 1 $mA/cm^2$ until the voltage reached one of the charging voltages (V) illustrated in Tables 1 and 2. Moreover, the storage conditions (storage temperature and storage time) were changed to change the intensity ratios IS/IF and IN/IF.

As battery characteristics of the secondary battery, cycle characteristics, high-output characteristics and swelling characteristics were examined. Results illustrated in Table 1 and Table 2 were obtained. It is to be noted that the intensity ratios IS/IF and IN/IF illustrated in Tables 1 and 2 were determined by analysis results of negative ion analysis using a TOF-SIMS apparatus by the foregoing procedure.

Upon examining the cycle characteristics, two cycles of charge and discharge were performed on the secondary battery in the ambient temperature environment (23° C.) to measure a discharging capacity (mAh) at the second cycle. Subsequently, the secondary battery was repeatedly charged and discharged until the total number of cycles reached 100 cycles in the same environment to measure a discharging capacity (mAh) at the 100th cycle. A discharging capacity retention ratio (%)=(discharging capacity at the 100th cycle/discharging capacity at the second cycle)×100 was calculated from the measurement results thereof. At the time of charge, charge was performed at current density of 1 mA/cm² until the battery voltage reached one of the charging voltages (V) illustrated in Tables 1 and 2, and charge was further performed at the same voltage until the current density reached 0.02 mA/cm². At the time of discharge, discharge was performed at current density of 1 mA/cm² until the battery voltage reached 2.5 V.

Upon examining the high-output characteristics, the secondary battery was charged and discharged in the ambient temperature environment (23° C.) to measure a discharging capacity (mAh). Thereafter, based on the weight (g) of the cathode active material, a high-output discharging capacity (mAh/g)=discharging capacity/weight of the cathode active material was calculated. At the time of charge, charge was performed at current of 10 C until the battery voltage reached one of the charge voltages (V) illustrated in Tables 1 and 2, and charge was further performed at the same voltage until the current density reached 0.02 mA/cm². At the time of discharge, discharge was performed at current of 10 C until the battery voltage reached 2.5 V. It is to be noted that "10 C" refers to a current value at which the battery capacity (theoretical capacity) is completely discharged in 0.1 hours.

Upon examining the swelling characteristics, after the thickness (mm) of the secondary battery before charge and discharge was measured in the ambient temperature environment (23° C.), 100 cycles of charge and discharge were performed on the secondary battery, and thereafter, the thickness (mm) after charge and discharge was measured. From the measurement results thereof, a swelling rate (%)=[(thickness after charge and discharge−thickness before charge and discharge)/thickness before charge and discharge]×100 was calculated. The charge and discharge conditions were similar to those in the case of examining the cycle characteristics.

A procedure of preparing a sample for analysis in order to perform negative ion analysis with use of the TOF-SIMS apparatus is as follows. In order to prevent a surface state (a surface component) of the cathode active material from being altered due to reaction with air, the secondary battery was disassembled in an argon glove box. First, the secondary battery in a charged state was placed in the argon glove box, and the secondary battery was disassembled to retrieve the cathode 33. Subsequently, the cathode 33 was cut with the use of ceramic scissors to obtain a sample with a size of about 1 cm square. Subsequently, in order to prevent a component and/or like in the electrolytic solution from staying, the sample was soaked in dimethyl carbonate for about 30 seconds to clean the sample. Finally, the sample was transported to the inside of the TOF-SIMS apparatus in an argon atmosphere, and the inside of the TOF-SIMS apparatus was vacuumed overnight. Accordingly, unnecessary dimethyl carbonate was volatilized, and the sample for analysis was thereby obtained.

TABLE 1

| Experimental Example | Cathode Active Material Central Section | Cathode Active Material Coating Section | Electrolytic Solution | IS/IF | IN/IF | Storage Conditions | Charging Voltage (V) | Discharging Capacity Retention Ratio (%) | High-output Discharging Capacity (mAh/g) | Swelling Rate (%) |
|---|---|---|---|---|---|---|---|---|---|---|
| 1 | LiCAMO | Formula (1-1) | — | 1.030 | 2.108 | 60° C. × 1 day | 4.20 | 78 | 49 | 19 |
| 2 | | | | 0.979 | 2.083 | 45° C. × 3 days | | 76 | 48 | 20 |
| 3 | | | | 0.950 | 2.051 | 23° C. × 1 week | | 74 | 47 | 20 |
| 4 | | | | 0.042 | 0.035 | 10° C. × 1 week | | 71 | 45 | 23 |
| 5 | | | | 0.040 | 0.030 | 23° C. × 1 day | | 70 | 44 | 24 |
| 6 | | Formula (1-2) | | 0.954 | 2.053 | 23° C. × 1 week | | 73 | 44 | 20 |
| 7 | | Formula (2-7) | | 0.986 | 2.109 | | | 75 | 47 | 19 |
| 8 | | Formula (2-8) | | 1.022 | 2.158 | | | 77 | 49 | 18 |
| 9 | | Formula (3-1) | | 0.972 | 0.012 | | | 74 | 46 | 30 |
| 10 | | Formula (4-1) | | 0.966 | 0.013 | | | 75 | 44 | 30 |
| 11 | | Formula (1-1) | | 0.672 | 1.655 | 23° C. × 1 week | 4.35 | 70 | 42 | 22 |
| 12 | | | | 0.432 | 1.391 | | 4.40 | 62 | 39 | 24 |
| 13 | | | | 0.217 | 1.126 | | 4.50 | 55 | 37 | 27 |

TABLE 2

| Experimental Example | Cathode Active Material Central Section | Cathode Active Material Coating Section | Electrolytic Solution | IS/IF | IN/IF | Storage Conditions | Charging Voltage (V) | Discharging Capacity Retention Ratio (%) | High-output Discharging Capacity (mAh/g) | Swelling Rate (%) |
|---|---|---|---|---|---|---|---|---|---|---|
| 14 | LiCAMO | — | — | 0.008 | 0.004 | 23° C. × 1 week | 4.20 | 55 | 29 | 32 |
| 15 | | Formula (1-1) | | 0.028 | 0.022 | — | | 58 | 32 | 30 |
| 16 | | | | 0.038 | 0.028 | 10° C. × 6 days | | 62 | 34 | 29 |
| 17 | | | | 0.039 | 0.029 | 23° C. × 20 hours | | 63 | 36 | 29 |
| 18 | | — | | 0.006 | 0.003 | 23° C. × 1 week | 4.35 | 54 | 28 | 31 |
| 19 | | | | 0.005 | 0.004 | | 4.40 | 52 | 26 | 32 |
| 20 | | | | 0.003 | 0.002 | | 4.50 | 49 | 24 | 32 |
| 21 | | — | Formula (1-1) | 0.020 | 0.016 | — | 4.20 | 58 | 31 | 31 |
| 22 | | | | 0.022 | 0.018 | 23° C. × 1 week | | 58 | 31 | 31 |
| 23 | | | Formula (2-7) | 0.023 | 0.014 | — | | 60 | 33 | 31 |
| 24 | | | | 0.024 | 0.015 | 23° C. × 1 week | | 61 | 34 | 30 |
| 25 | | | Formula (2-8) | 0.025 | 0.015 | — | | 61 | 34 | 31 |
| 26 | | | | 0.026 | 0.016 | 23° C. × 1 week | | 61 | 34 | 30 |
| 27 | | | Formula (3-1) | 0.022 | 0.007 | — | | 58 | 31 | 32 |
| 28 | | | | 0.023 | 0.008 | 23° C. × 1 week | | 58 | 31 | 32 |
| 29 | | | Formula (4-1) | 0.021 | 0.006 | — | | 56 | 29 | 33 |
| 30 | | | | 0.022 | 0.007 | 23° C. × 1 week | | 57 | 30 | 32 |

In the case where the intensity ratio IS/IF was 0.04 or more, compared to the case where the intensity ratio IS/IF was smaller than 0.04, the discharging capacity retention ratio and the high-output discharging capacity were remarkably increased, and the swelling rate was remarkably decreased. In particular, in the case where the intensity ratio IS/IF was 0.04 or more, even if the charging voltage was increased, a high discharging capacity retention ratio and a high high-output discharging capacity were obtained.

Moreover, in the case where the intensity ratio IS/IF was 0.04 or more, and the intensity ratio IN/IF was 0.03 or more, compared to the case where the intensity ratio IN/IF was smaller than 0.03, while a high discharging capacity retention ratio and a high high-output discharging capacity were maintained, the swelling rate was decreased.

These results indicate that, in the case where the coating section 102 is used, the discharging capacity retention ratio and the high-output discharging capacity are not improved only by providing the coating section 102 on the central section 101. In order to improve the discharging capacity retention ratio and the high-output discharging capacity, it is necessary to make the intensity ratio IS/IF appropriate.

Moreover, the foregoing results indicate that, as the formation material of the coating section 102, the sulfonyl compound may be preferable in order to improve the discharging capacity retention ratio and the high-output discharging capacity, and a nitrogen-containing sulfonyl compound may be more preferable in order to improve the swelling rate as well.

It is to be noted that, in the case where the intensity ratio IS/IF was smaller than 0.04, even if the sulfonyl compound was contained in the electrolytic solution, the discharging capacity retention ratio, the high-output discharging capacity, and the swelling rate were hardly improved.

From the results in Tables 1 and 2, when the intensity ratio IS/IF, determined by negative ion analysis on the active material with use of TOF-SIMS, in the active material capable of inserting and extracting the electrode reactant was 0.04 or more, superior battery characteristics were obtained.

The present technology has been described with reference to the embodiment and the examples. However, the present technology is not limited to the examples described in the embodiment and the examples, and various modifications may be made. For example, the description has been given with the specific examples of the case in which the battery structure is the cylindrical type or the laminated film type, and the battery device has the spirally wound structure. However, applicable structures are not limited thereto. The secondary battery of the present technology is similarly applicable to a battery having other battery structure such as a square-type battery, a coin-type battery, and a button-type battery, or a battery in which the battery device has other structure such as a laminated structure.

Moreover, the secondary battery-use active material and the secondary battery-use electrode of the present technology may be applied not only to a secondary battery, but also to other electrochemical devices. Examples of other electrochemical devices may include a capacitor.

Further, description has been given of an appropriate range derived from the results of the examples for the range of the intensity ratio IS/IF. However, the description does not totally deny a possibility that the intensity ratio IS/IF becomes out of the foregoing range. That is, the foregoing appropriate range is a particularly preferable range to obtain the effect of the present technology. Therefore, as long as the effect of the present technology is obtainable, the intensity ratio may be out of the foregoing range in some degree. The same is applicable to the intensity ratio IN/IF.

It is possible to achieve at least the following configurations from the above-described example embodiments and the modifications of the technology.

(1) A secondary battery including:
a cathode;
an anode; and
an electrolytic solution, wherein
the cathode contains an active material capable of inserting and extracting an electrode reactant, and
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry.

(2) The secondary battery according to (1), in which
the active material includes a central section and a coating section, the central section being capable of inserting and extracting the electrode reactant, and the coating section being provided on the central section, and
the coating section contains a compound having a sulfonyl group ($>SO_2$).

(3) The secondary battery according to (2), in which the compound having the sulfonyl group contains one or more of compounds represented by the following formulas (1) to (4),

[Chem. 9]

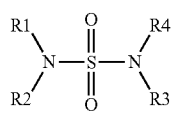

(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 may be bound to one another,

[Chem. 10]

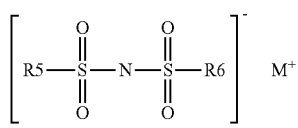

(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 may be bound to each other, and M is a metal element,

[Chem. 11]

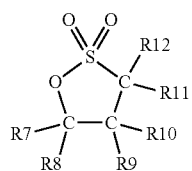

(3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R7 to R12 may be bound to one another, and

[Chem. 12]

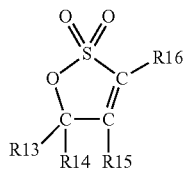

(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 may be bound to one another.

(4) The secondary battery according to (3), in which
the compound represented by the formula (1) contains one or more of compounds represented by the following formulas (1-1) to (1-13),
the compound represented by the formula (2) contains one or more of compounds represented by the following formulas (2-1) to (2-11),
the compound represented by the formula (3) contains one or more of compounds represented by the following formulas (3-1) to (3-11), and
the compound represented by the formula (4) contains one or more of compounds represented by the following formulas (4-1) to (4-11).

[Chem. 13]

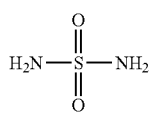

(1-1)

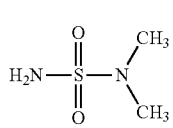

(1-2)

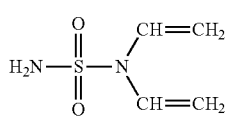

(1-3)

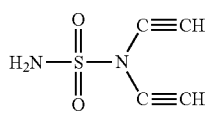

(1-4)

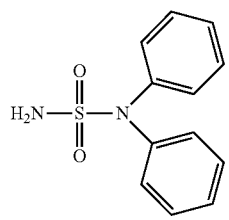 (1-5)
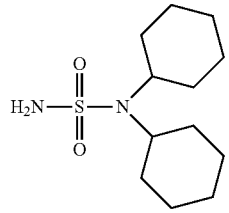 (1-6)
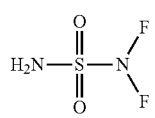 (1-7)
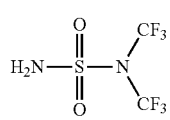 (1-8)
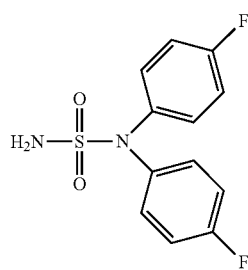 (1-9)
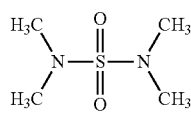 (1-10)
 (1-11)
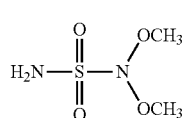 (1-12)
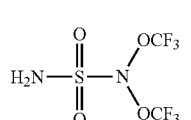 (1-13)
[Chem. 14]
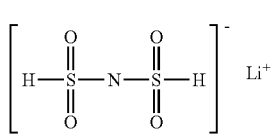 (2-1)
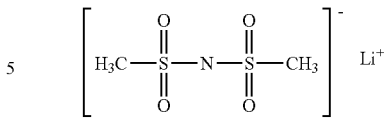 (2-2)
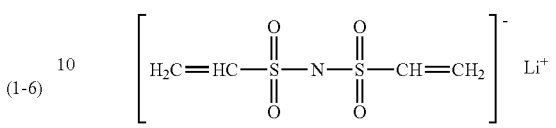 (2-3)
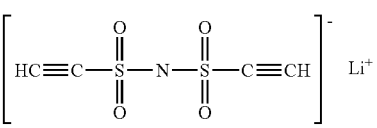 (2-4)
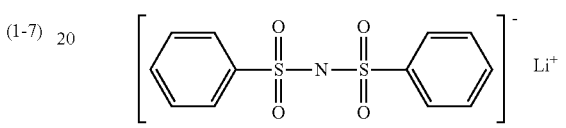 (2-5)
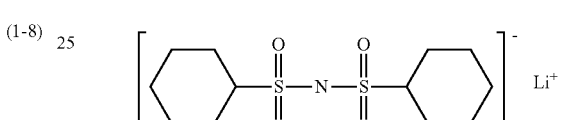 (2-6)
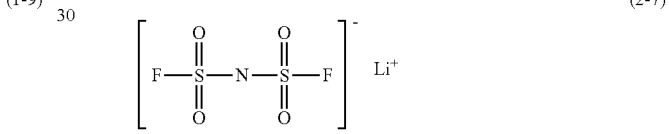 (2-7)
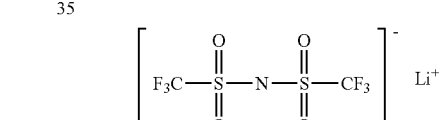 (2-8)
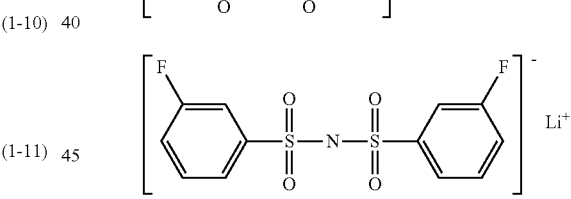 (2-9)
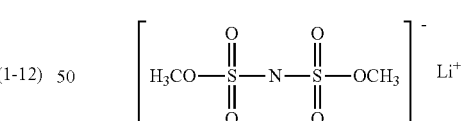 (2-10)
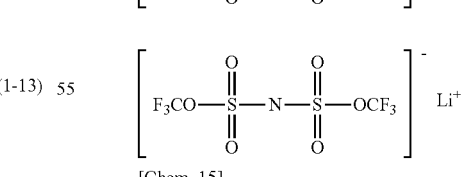 (2-11)
[Chem. 15]
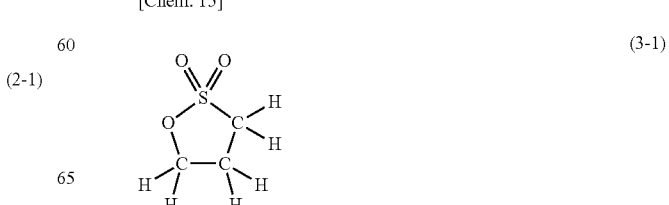 (3-1)

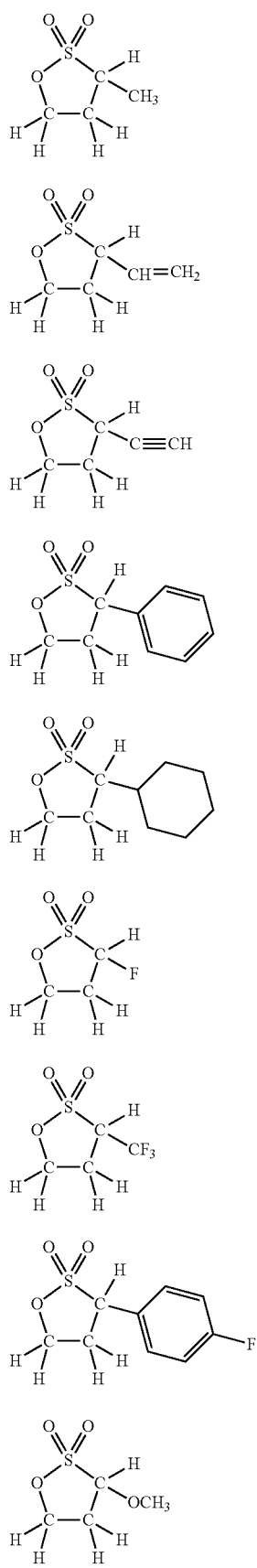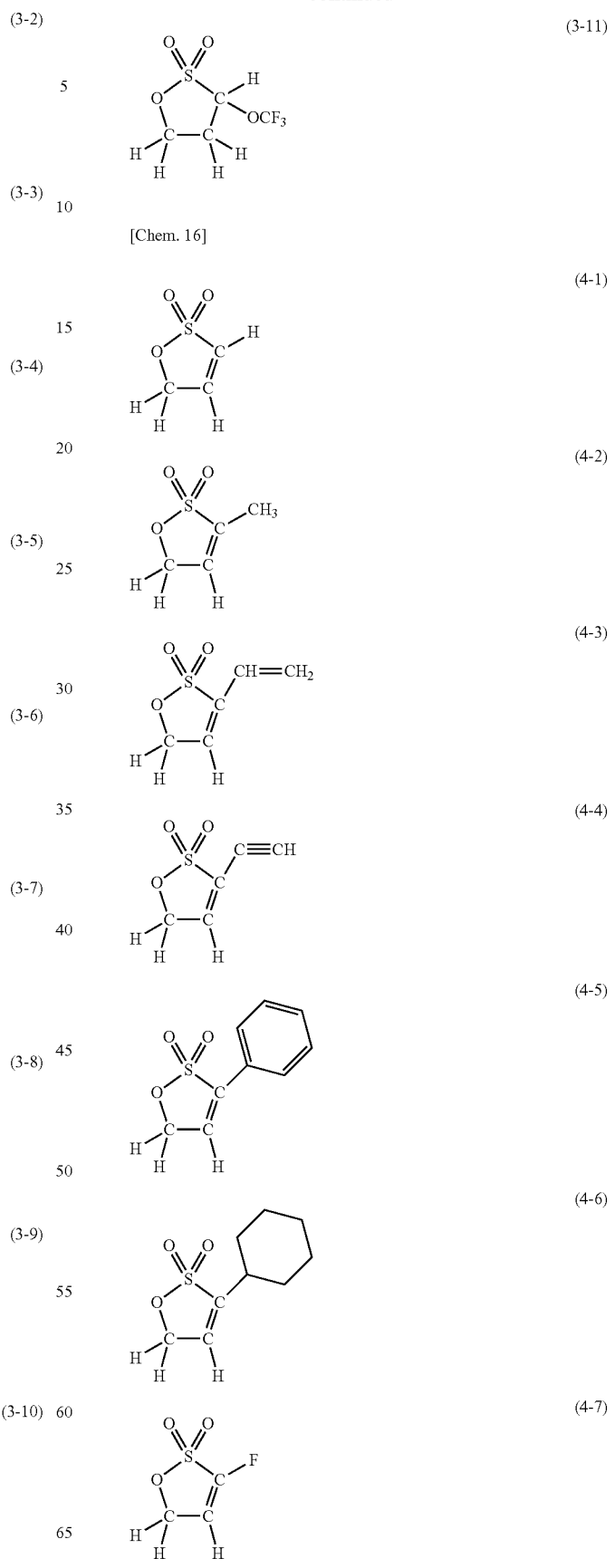

-continued

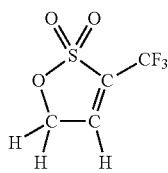
(4-8)

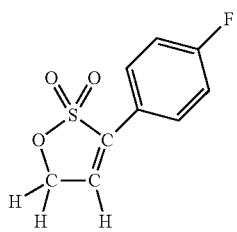
(4-9)

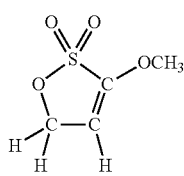
(4-10)

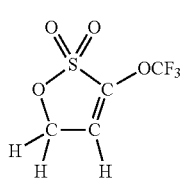
(4-11)

(5) The secondary battery according to (1), in which a ratio IN/IF of a peak intensity IN derived from $SNO_2^-$ and the peak intensity IF derived from $LiF_2^-$ is 0.03 or more, the peak intensity IN and the peak intensity IF being obtained by negative ion analysis on the active material with use of time-of-flight secondary ion mass spectrometry.

(6) The secondary battery according to (5), in which the active material includes a central section and a coating section, the central section being capable of inserting and extracting the electrode reactant, and the coating section being provided on the central section, and the coating section contains a compound having a sulfonyl group ($>SO_2$) and a nitrogen bond ($>N-$).

(7) The secondary battery according to (6), in which the compound having the sulfonyl group and the nitrogen bond contains one or more of compounds represented by the following formulas (1) and (2),

[Chem. 17]

(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 may be bound to one another, and

[Chem. 18]

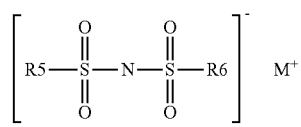
(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element.

(8) The secondary battery according to (7), in which the compound represented by the formula (1) contains one or more of compounds represented by the following formulas (1-1) to (1-13), and the compound represented by the formula (2) contains one or more of compounds represented by the following formulas (2-1) to (2-11).

[Chem. 19]

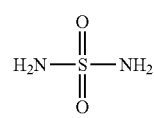
(1-1)

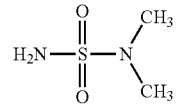
(1-2)

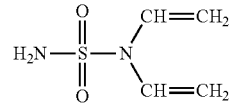
(1-3)

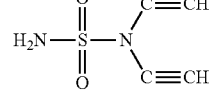
(1-4)

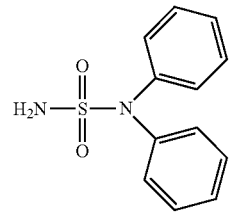
(1-5)

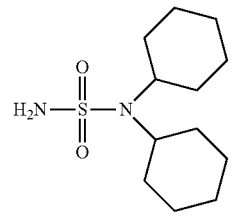
(1-6)

-continued (1-7) 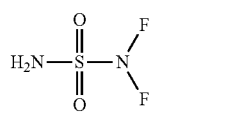

(1-8) 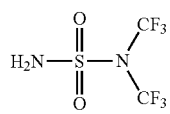

(1-9) 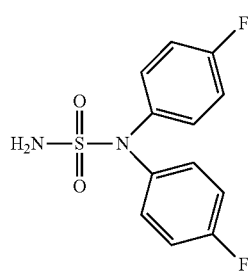

(1-10) 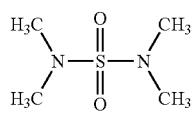

(1-11) 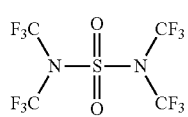

(1-12) 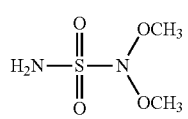

(1-13) 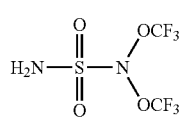

[Chem. 20]

(2-1) 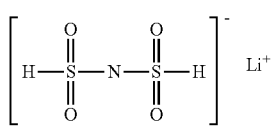

(2-2) 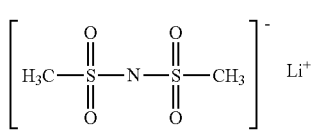

(2-3) 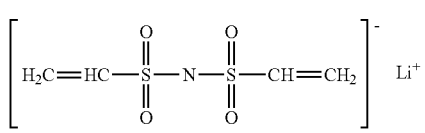

(2-4) 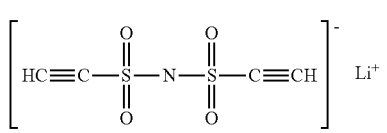

(2-5)

(2-6)

(2-7)

(2-8)

(2-9)

(2-10)

(2-11)

(9) The secondary battery according to any one of (1) to (8), in which
the active material contains a lithium composite oxide, and
the lithium composite oxide contains lithium (Li) and one or more transition metal elements as constituent elements.

(10) The secondary battery according to (9), in which the lithium composite oxide contains cobalt (Co) as the transition metal element, and has a layered rock-salt crystal structure.

(11) The secondary battery according to (9) or (10), in which the lithium composite oxide contains, on its surface, one or more elements different from the transition metal element.

(12) The secondary battery according to any one of (1) to (11), in which
an upper limit of a charging voltage is from 4.2 V to 4.8 V both inclusive, and
a lower limit of a discharging voltage is from 2.0 V to 3.3 V both inclusive.

(13) The secondary battery according to any one of (1) to (12), in which the secondary battery is a lithium secondary battery.

(14) A secondary battery-use electrode including an active material capable of inserting and extracting an electrode reactant, in which a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry.

(15) A secondary battery-use active material, in which the secondary battery-use active material is capable of inserting and extracting an electrode reactant, and a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry.

(16) A battery pack including:

the secondary battery according to any one of (1) to (13);

a control section configured to control a usage state of the secondary battery; and a switch section configured to switch the usage state of the secondary battery according to an instruction of the control section

(17) An electric vehicle including:

the secondary battery according to any one of (1) to (13);

a conversion section configured to convert electric power supplied from the secondary battery into drive power;

a drive section configured to operate according to the drive power; and a control section configured to control a usage state of the secondary battery.

(18) an electric power storage system including:

the secondary battery according to any one of (1) to (13);

one or more electric devices configured to be supplied with electric power from the secondary battery; and a control section configured to control the supplying of the electric power from the secondary battery to the one or more electric devices.

(19) An electric power tool including:

the secondary battery according to any one of (1) to (13); and a movable section configured to be supplied with electric power from the secondary battery.

(20) An electronic apparatus including the secondary battery according to any one of (1) to (13) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a cathode;
an anode; and
an electrolytic solution, wherein
the cathode contains an active material capable of inserting and extracting an electrode reactant, and
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group ($>SO_2$), the compound having the sulfonyl group contains one or more of compounds represented by the following formulas (1) to (4),

[Chem. 1]

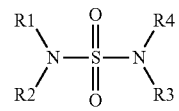

(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

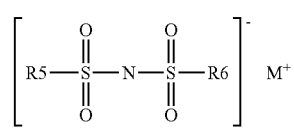

(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

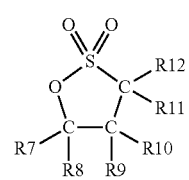

(3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

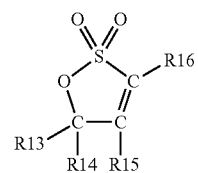

(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

2. The secondary battery according to claim 1, wherein
the compound represented by the formula (1) contains one or more of compounds represented by the following formulas (1-1) to (1-13),
the compound represented by the formula (2) contains one or more of compounds represented by the following formulas (2-1) to (2-11),
the compound represented by the formula (3) contains one or more of compounds represented by the following formulas (3-2) to (3-11), and
the compound represented by the formula (4) contains one or more of compounds represented by the following formulas (4-1) to (4-11).

[Chem. 5]

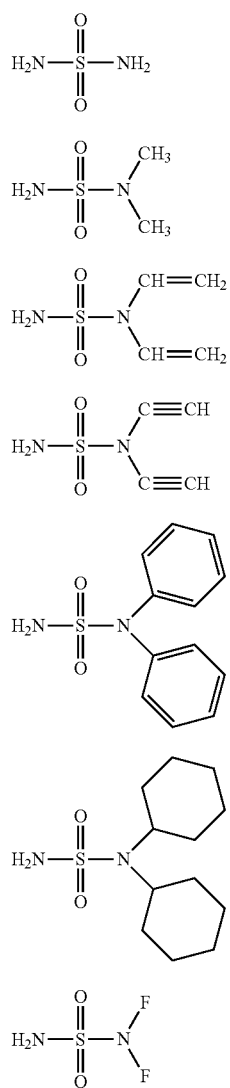

(1-1)
(1-2)
(1-3)
(1-4)
(1-5)
(1-6)
(1-7)

-continued

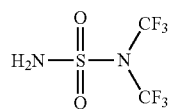 (1-8)

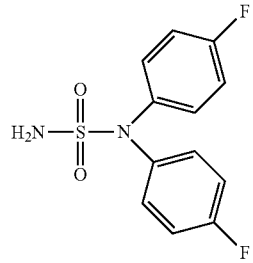 (1-9)

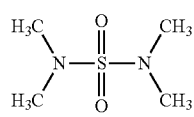 (1-10)

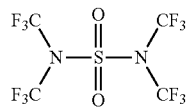 (1-11)

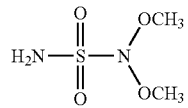 (1-12)

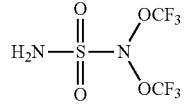 (1-13)

[Chem. 6]

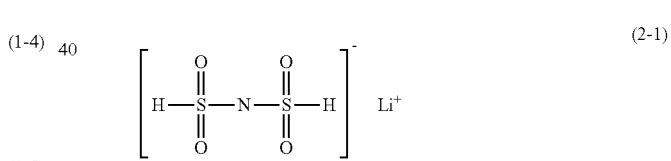 (2-1)

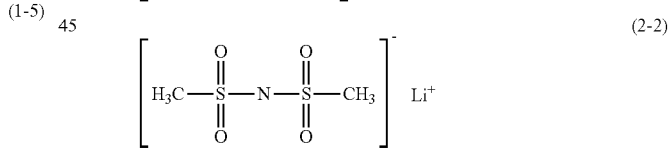 (2-2)

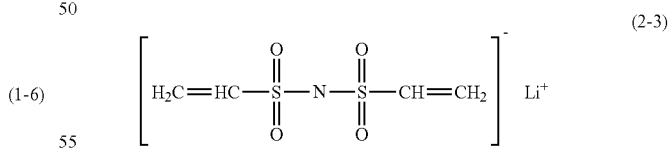 (2-3)

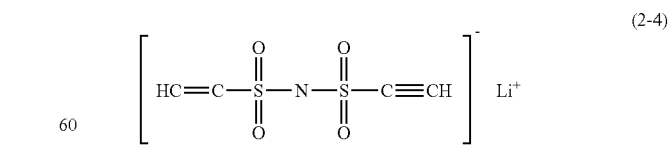 (2-4)

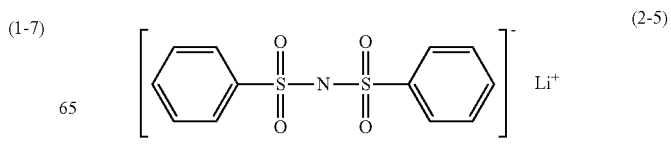 (2-5)

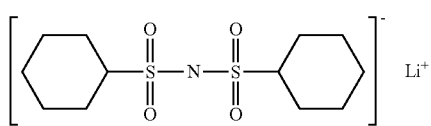 (2-6)
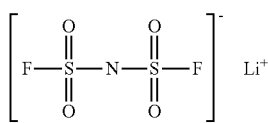 (2-7)
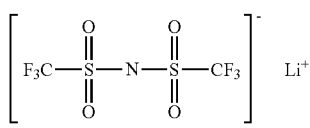 (2-8)
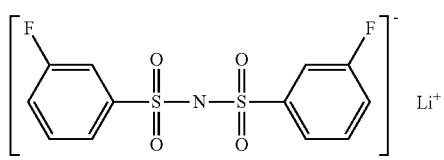 (2-9)
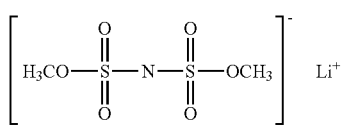 (2-10)
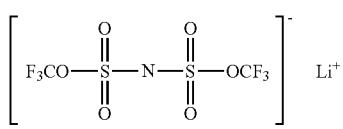 (2-11)
[Chem. 7]
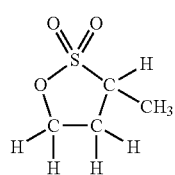 (3-2)
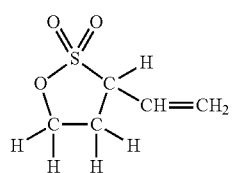 (3-3)
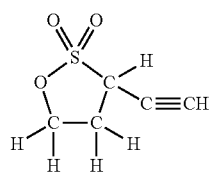 (3-4)
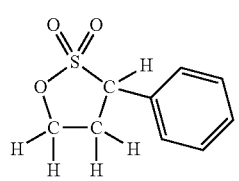 (3-5)
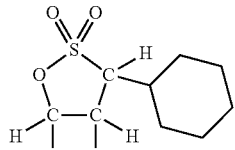 (3-6)
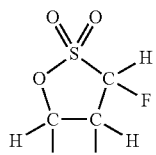 (3-7)
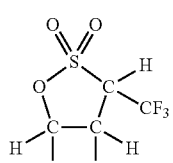 (3-8)
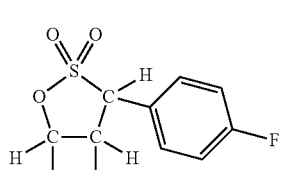 (3-9)
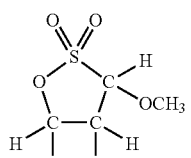 (3-10)
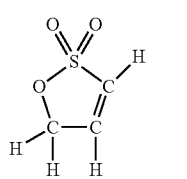 (3-11)
[Chem. 8]
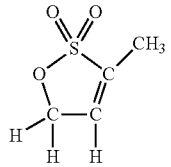 (4-1)
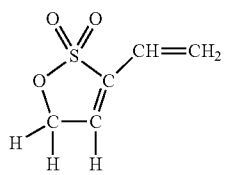 (4-2)
(4-3)

(4-4) 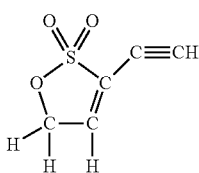

(4-5) 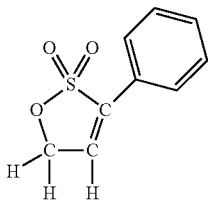

(4-6) 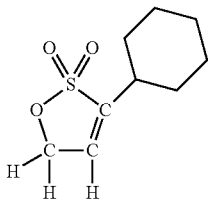

(4-7) 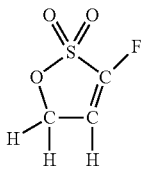

(4-8) 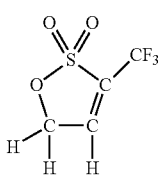

(4-9) 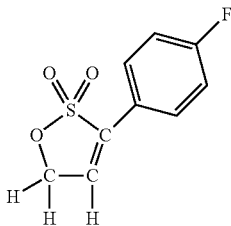

(4-10) 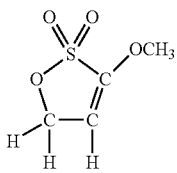

(4-11) 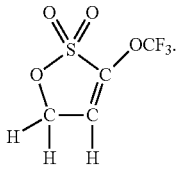

3. The secondary battery according to claim 1, wherein the active material contains a lithium composite oxide, and the lithium composite oxide contains lithium (Li) and one or more transition metal elements as constituent elements.

4. The secondary battery according to claim 3, wherein the lithium composite oxide contains cobalt (Co) as the transition metal element, and has a layered rock-salt crystal structure.

5. The secondary battery according to claim 3, wherein the lithium composite oxide contains, on its surface, one or more elements different from the transition metal element.

6. The secondary battery according to claim 1, wherein
an upper limit of a charging voltage is from 4.2 V to 4.8 V both inclusive, and
a lower limit of a discharging voltage is from 2.0 V to 3.3 V both inclusive.

7. The secondary battery according to claim 1, wherein the secondary battery is a lithium secondary battery.

8. A secondary battery comprising:
a cathode;
an anode; and
an electrolytic solution, wherein
the cathode contains an active material capable of inserting and extracting an electrode reactant, and wherein a ratio IN/IF of a peak intensity IN derived from $SNO_2^-$ and the peak intensity IF derived from $LiF_2^-$ is 0.03 or more, the peak intensity IN and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group ($>SO_2$) and a nitrogen bond ($>N-$),
the compound having the sulfonyl group and the nitrogen bond contains one or more of compounds represented by the following formulas (1) and (2),

[Chem. 9]

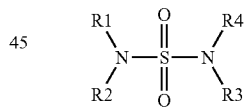

(1)

where each of R1 to R4 is one of a hydrogen group, a hydrocarbon group having more than 6 carbon atoms, an oxygen-containing hydrocarbon group having more than 6 carbon atoms, a halogen group, a halogenated hydrocarbon group, a halogenated oxygen-containing hydrocarbon group, and a group obtained by binding two or more thereof, and any two or more of R1 to R4 are optionally bound to one another, and

[Chem. 10]

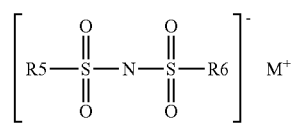

(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element.

9. The secondary battery according to claim 8, wherein the compound represented by the formula (1) contains one or more of compounds represented by the following formulas (1-1) to (1-9), (1-11), and (1-13), and the compound represented by the formula (2) contains one or more of compounds represented by the following formulas (2-1) to (2-11)

[Chem. 11]

(1-1)
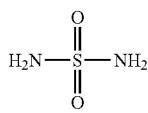

(1-2)
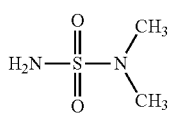

(1-3)
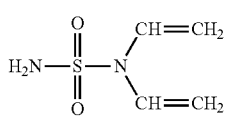

(1-4)
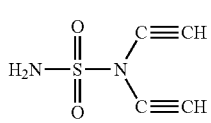

(1-5)
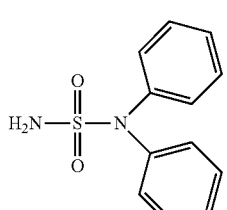

(1-6)
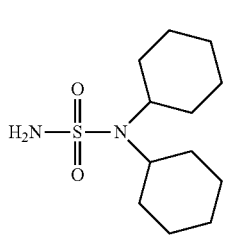

(1-7)
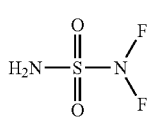

(1-8)
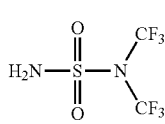

(1-9)
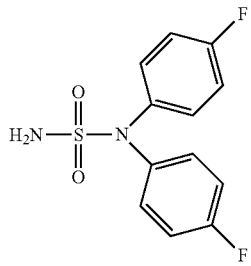

(1-11)
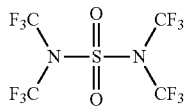

(1-13)
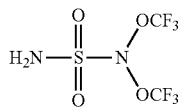

[Chem. 12]

(2-1)
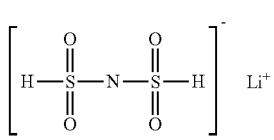

(2-2)
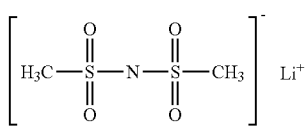

(2-3)
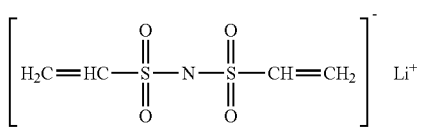

(2-4)
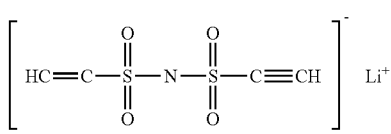

(2-5)
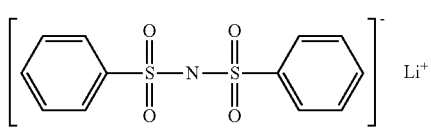

(2-6)
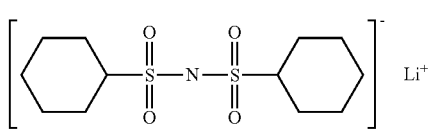

(2-7)
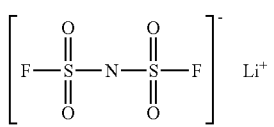

(2-8)
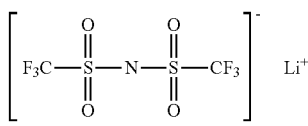

-continued

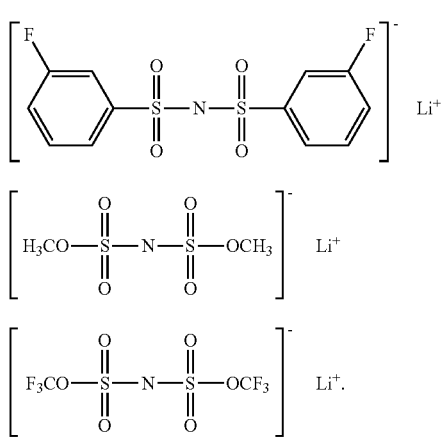   (2-9)

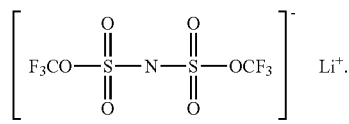   (2-10)

   (2-11)

10. A secondary battery-use electrode comprising an active material capable of inserting and extracting an electrode reactant, wherein
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group (>$SO_2$),
the compound having the sulfonyl group contains one or more of compounds represented by the following formulas (1) to (4),

[Chem. 1]

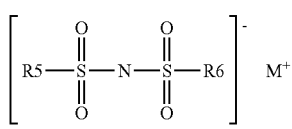   (1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

[ R5—S(=O)(=O)—N—S(=O)(=O)—R6 ]$^-$ M$^+$   (2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

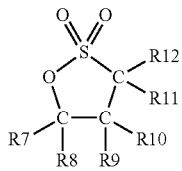   (3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

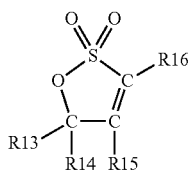   (4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

11. A secondary battery-use active material, wherein
the secondary battery-use active material is capable of inserting and extracting an electrode reactant, and
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group (>$SO_2$),
the compound having the sulfonyl group contains one or more of compounds represented by the following formulas (1) to (4),

[Chem. 1]

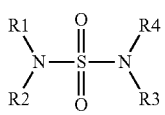   (1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

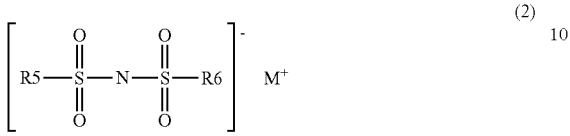

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

12. A battery pack comprising:
a secondary battery;
a control section configured to control a usage state of the secondary battery; and
a switch section configured to switch the usage state of the secondary battery according to an instruction of the control section, wherein the secondary battery includes a cathode, an anode, and an electrolytic solution,
the cathode contains an active material capable of inserting and extracting an electrode reactant, and
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group (>$SO_2$),
the compound having the sulfonyl group contains one or more of compounds represented by the following formulas (1) to (4),

[Chem. 1]

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

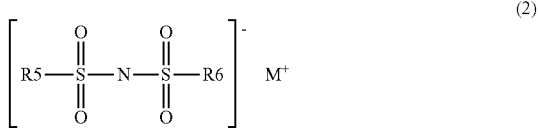

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

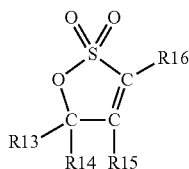

(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

13. An electric vehicle comprising:
a secondary battery;
a conversion section configured to convert electric power supplied from the secondary battery into drive power;
a drive section configured to operate according to the drive power; and
a control section configured to control an usage state of the secondary battery, wherein
the secondary battery includes a cathode, an anode, and an electrolytic solution,
the cathode contains an active material capable of inserting and extracting an electrode reactant, and
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group (>$SO_2$),
the compound having the sulfonyl group contains one or more of compounds represented by the following formulas (1) to (4),

[Chem. 1]

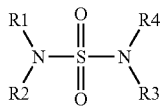

(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

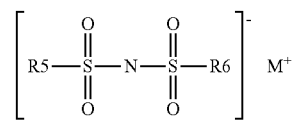

(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

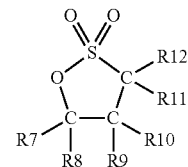

(3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

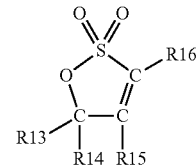

(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

14. An electric power storage system comprising:
a secondary battery;
one or more electric devices configured to be supplied with electric power from the secondary battery; and
a control section configured to control the supplying of the electric power from the secondary battery to the one or more electric devices, wherein
the secondary battery includes a cathode, an anode, and an electrolytic solution,
the cathode contains an active material capable of inserting and extracting an electrode reactant, and a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group (>$SO_2$), the compound having the sulfonyl group contains one or more of compounds represented by the following formulas (1) to (4),

[Chem. 1]

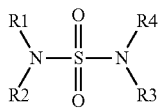

(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

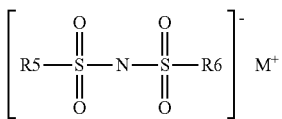

(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

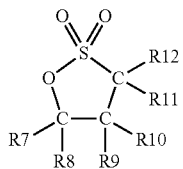

(3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

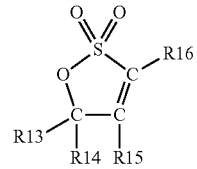

(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

15. An electric power tool comprising:
a secondary battery; and
a movable section configured to be supplied with electric power from the secondary battery, wherein
the secondary battery includes a cathode, an anode, and an electrolytic solution,
the cathode contains an active material capable of inserting and extracting an electrode reactant, and
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group (>$SO_2$), the compound having the sulfonyl group contains one or more of compounds represented by the following formulas (1) to (4),

[Chem. 1]

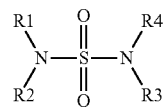

(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

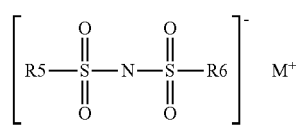

(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

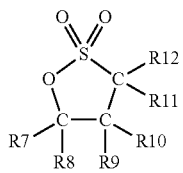

(3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

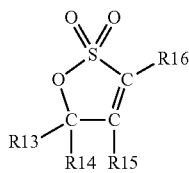

(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

16. An electronic apparatus comprising an secondary battery as an electric power supply source, wherein
the secondary battery includes a cathode, an anode, and an electrolytic solution,
the cathode contains an active material capable of inserting and extracting an electrode reactant, and
a ratio IS/IF of a peak intensity IS derived from $SO_2^-$ and a peak intensity IF derived from $LiF_2^-$ is 0.04 or more, the peak intensity IS and the peak intensity IF being obtained by negative ion analysis on the active material with use of time-of-flight secondary ion mass spectrometry, the active material includes a central section and a coating section, the central section being capable of inserting and extracting the electrode reactant, and the coating section being provided on the central section, and the coating section contains a compound having a sulfonyl group (>$SO_2$),
the compound having the sulfonyl group contains one or more of compounds represented by the following formulas (1) to (4),

[Chem. 1]

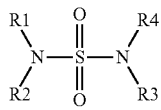

(1)

where each of R1 to R4 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R1 to R4 are optionally bound to one another,

[Chem. 2]

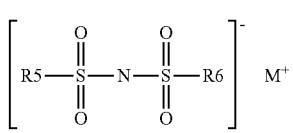

(2)

where each of R5 and R6 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R5 and R6 are optionally bound to each other, and M is a metal element,

[Chem. 3]

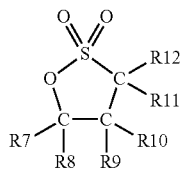

(3)

where each of R7 to R12 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, R7 to R12 are not all hydrogen groups, and any two or more of R7 to R12 are optionally bound to one another, and

[Chem. 4]

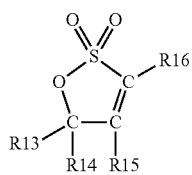

(4)

where each of R13 to R16 is one of a hydrogen group, a hydrocarbon group, an oxygen-containing hydrocarbon group, a halogen group, a halogenated hydrocarbon group, a halogenated oxygen-containing hydrocarbon group, and a group obtained by binding two or more thereof, and any two or more of R13 to R16 are optionally bound to one another.

* * * * *